United States Patent
Miyawaki et al.

(10) Patent No.: US 9,173,188 B2
(45) Date of Patent: Oct. 27, 2015

(54) COMMUNICATION APPARATUS, POSITION INFORMATION MANAGEMENT SYSTEM, AND POSITION INFORMATION MANAGEMENT METHOD

(71) Applicants: Seiji Miyawaki, Kanagawa (JP); Yasuo Ohashi, Kanagawa (JP); Michitaka Fukuda, Kanagawa (JP); Shin Kusakari, Kanagawa (JP); Kunihiro Miyauchi, Kanagawa (JP); Satoshi Kawasaki, Kanagawa (JP); Takaaki Hiroi, Tokyo (JP); Shinji Aoki, Kanagawa (JP); Yusuke Matsushita, Kanagawa (JP)

(72) Inventors: Seiji Miyawaki, Kanagawa (JP); Yasuo Ohashi, Kanagawa (JP); Michitaka Fukuda, Kanagawa (JP); Shin Kusakari, Kanagawa (JP); Kunihiro Miyauchi, Kanagawa (JP); Satoshi Kawasaki, Kanagawa (JP); Takaaki Hiroi, Tokyo (JP); Shinji Aoki, Kanagawa (JP); Yusuke Matsushita, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 256 days.

(21) Appl. No.: 13/893,522

(22) Filed: May 14, 2013

(65) Prior Publication Data

US 2013/0324153 A1  Dec. 5, 2013

(30) Foreign Application Priority Data

May 30, 2012 (JP) .................................. 2012-123116
Mar. 6, 2013 (JP) .................................. 2013-043648

(51) Int. Cl.
| | |
|---|---|
| H04W 4/04 | (2009.01) |
| H04W 64/00 | (2009.01) |
| G01S 1/70 | (2006.01) |
| G01S 5/00 | (2006.01) |

(52) U.S. Cl.
CPC .................. *H04W 64/00* (2013.01); *G01S 1/70* (2013.01); *G01S 5/0072* (2013.01)

(58) Field of Classification Search
CPC ..................................... H04W 4/02; H04W 4/04
USPC ....................... 455/456.1, 456.2, 456.5, 456.6
See application file for complete search history.

(56) References Cited

U.S. PATENT DOCUMENTS 7,529,544 B1 *  5/2009  Oh et al. ..................... 455/426.2
8,249,914 B2    8/2012  Umeda (Continued)

FOREIGN PATENT DOCUMENTS

| EP | 1 732 247 | 12/2006 |
|---|---|---|
| EP | 1 760 013 | 3/2007 |

(Continued)

OTHER PUBLICATIONS

Extended European Search Report dated Sep. 27, 2013.

(Continued)

*Primary Examiner* — Christopher M Brandt
(74) *Attorney, Agent, or Firm* — Harness, Dickey & Pierce, P.L.C.

(57) ABSTRACT

A communication apparatus which transmits information on a position at which the communication apparatus is positioned is disclosed. The communication apparatus includes a detecting unit which detects one of a first signal which is detected when the communication apparatus is fixed to an installed location and a second signal which is detected when the communication apparatus is brought to a state in which it is not fixed to the installed location; a storage unit which stores therein the position information; and a control unit which erases the position information stored in the storage unit when the second signal is detected after the first signal is detected by the detecting unit.

8 Claims, 22 Drawing Sheets

(56) References Cited

U.S. PATENT DOCUMENTS

| | | |
|---|---|---|
| 8,280,398 B2 | 10/2012 | Ishii et al. |
| 2006/0101190 A1 | 5/2006 | McLean |
| 2007/0177161 A1 | 8/2007 | Ishii et al. |
| 2007/0192869 A1 | 8/2007 | Garfinkle |
| 2008/0278324 A1* | 11/2008 | Uchimura et al. ......... 340/572.1 |
| 2011/0241848 A1 | 10/2011 | Van Herk |
| 2011/0285499 A1 | 11/2011 | Nakamachi et al. |

FOREIGN PATENT DOCUMENTS

| | | |
|---|---|---|
| JP | 09-136580 | 5/1997 |
| JP | 2004-302599 | 10/2004 |
| JP | 2005-158007 | 6/2005 |
| JP | 2010-44950 | 2/2010 |
| JP | 2010-159980 | 7/2010 |
| JP | 4620410 | 1/2011 |
| WO | WO 02/47292 | 6/2002 |
| WO | WO 2005/086375 | 9/2005 |
| WO | WO 2010/067247 | 6/2010 |

OTHER PUBLICATIONS

U.S. Appl. No. 13/784,961, filed Mar. 5, 2013.

U.S. Appl. No. 13/795,383, filed Mar. 12, 2013.

\* cited by examiner

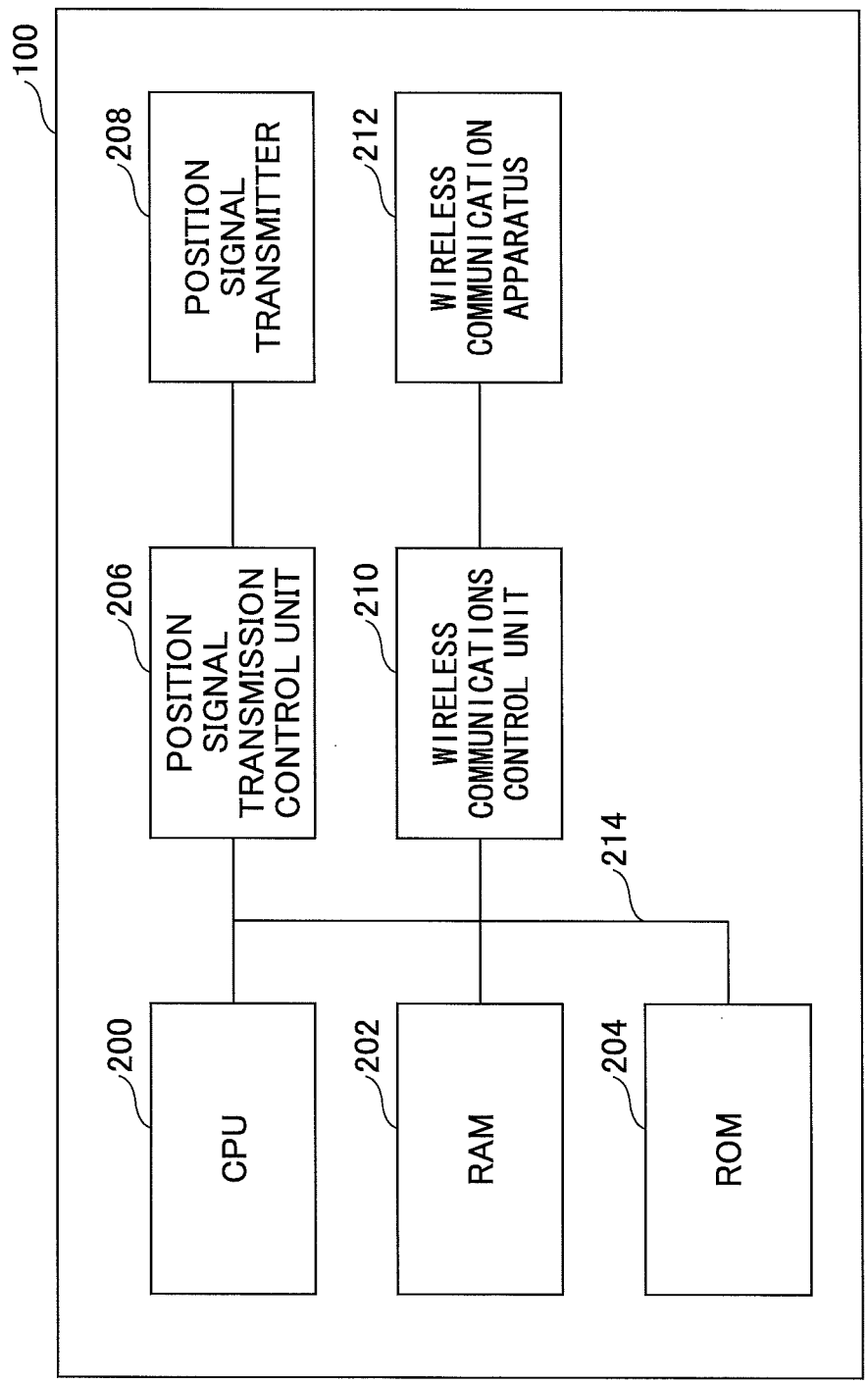

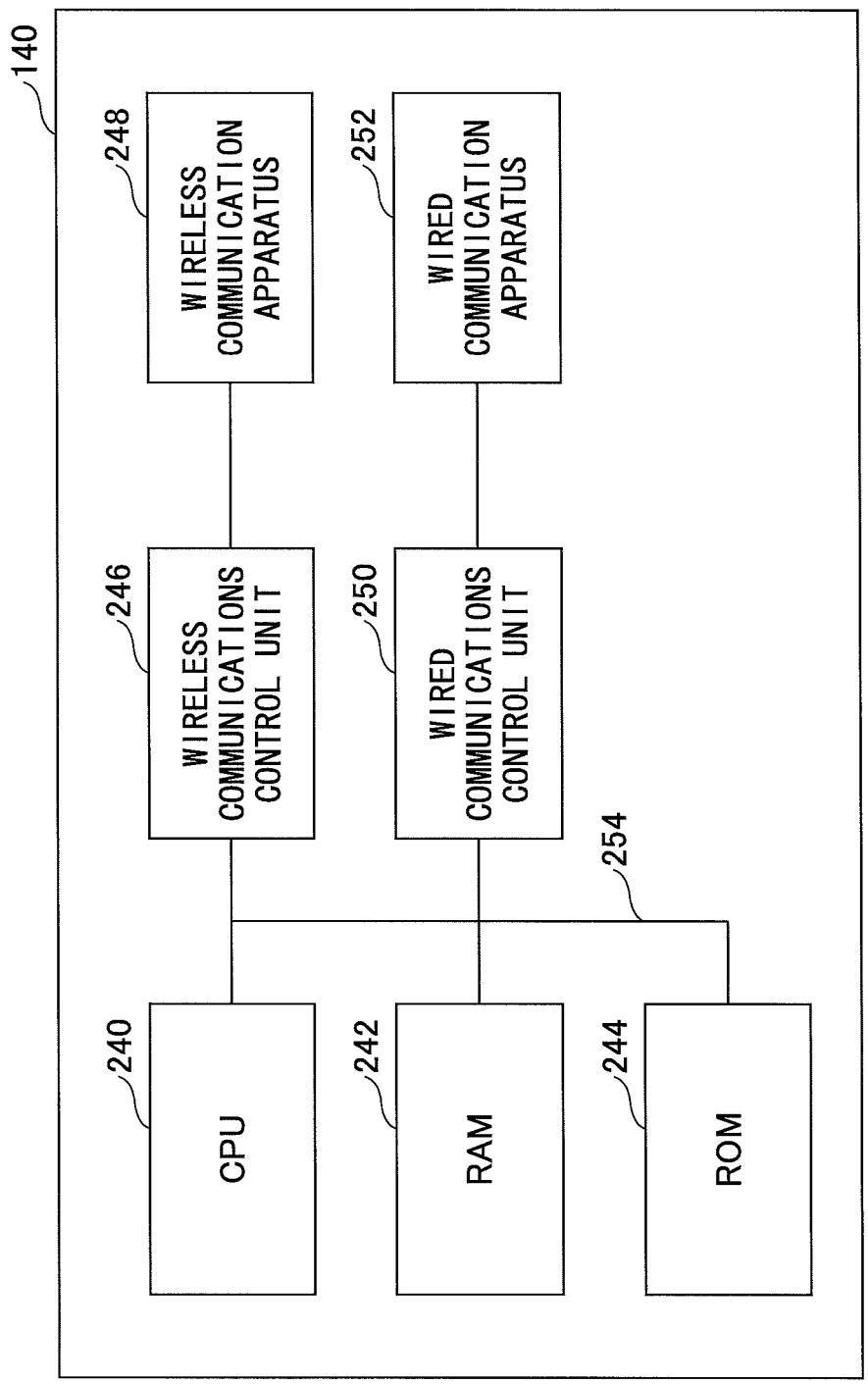

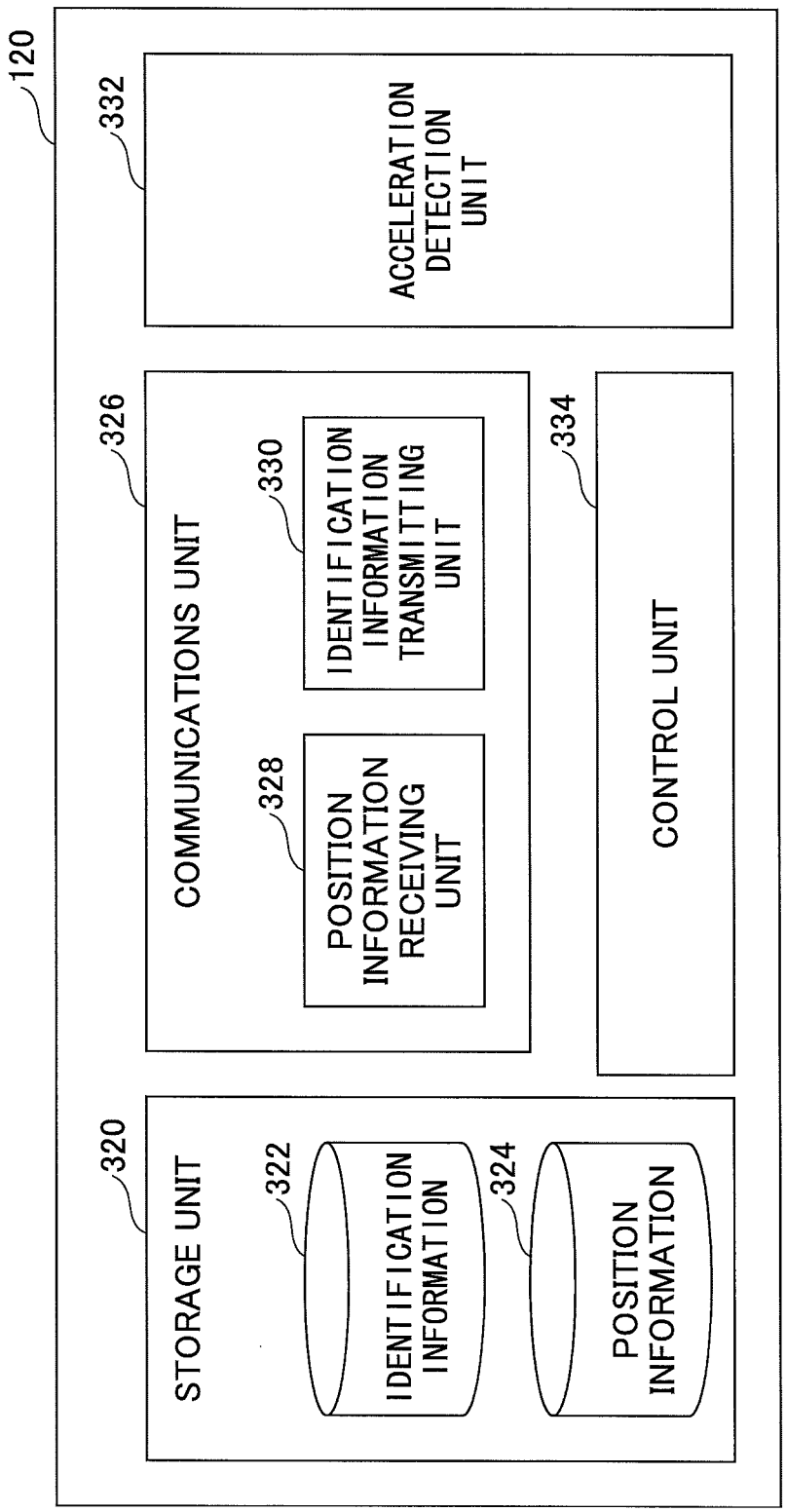

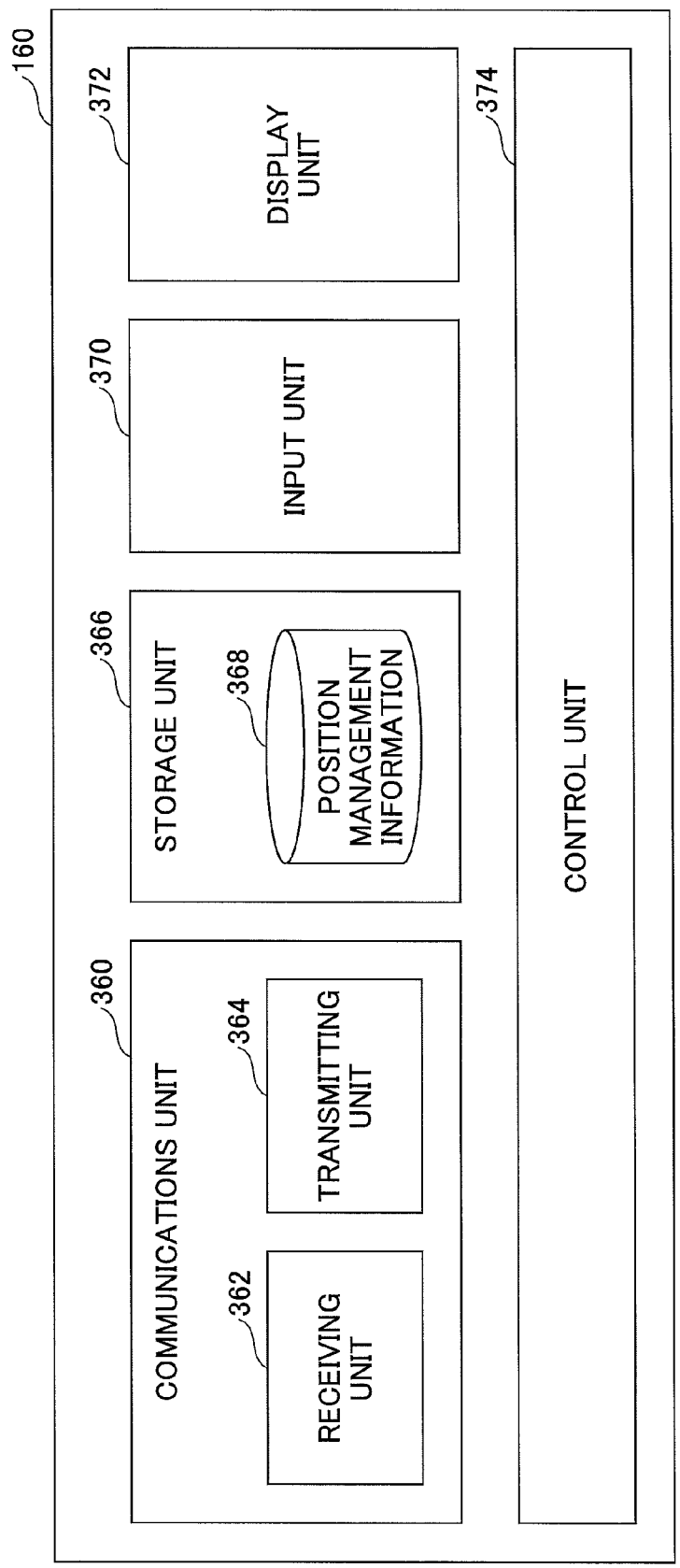

FIG.4

| FLOOR NUMBER | LATITUDE | LONGITUDE | BUILDING NUMBER |
|---|---|---|---|
| 16 | 35.459555 | 139.387110 | C |

FIG.5

| FLOOR NUMBER | LATITUDE | LONGITUDE | BUILDING NUMBER |
|---|---|---|---|
| 16 | 35.459555 | 139.387110 | C |

FIG.6

| FLOOR NUMBER 9bit | LATITUDE 21bit | LONGITUDE 21bit | BUILDING NUMBER 8bit |
|---|---|---|---|

FIG.7

| IDENTIFICATION INFORMATION | LATITUDE | LONGITUDE | FLOOR NUMBER | BUILDING | RECEIVED DATE/TIME | EQUIPMENT NAME | OWNING DEPARTMENT |
|---|---|---|---|---|---|---|---|
| 002673abcdef01 | 35.459555 | 139.387110 | 16 | C | 11/12/12 13:30:01 | PJ WX4310 | SALES DEPARTMENT No. 1 |
| 002673abcdef02 | 35.459483 | 139.388437 | 4 | A | 11/12/12 13:30:03 | UCS P3000 | SALES DEPARTMENT No. 1 |
| .. | .. | .. | .. | .. | .. | .. | |
| .. | .. | .. | .. | .. | .. | .. | |

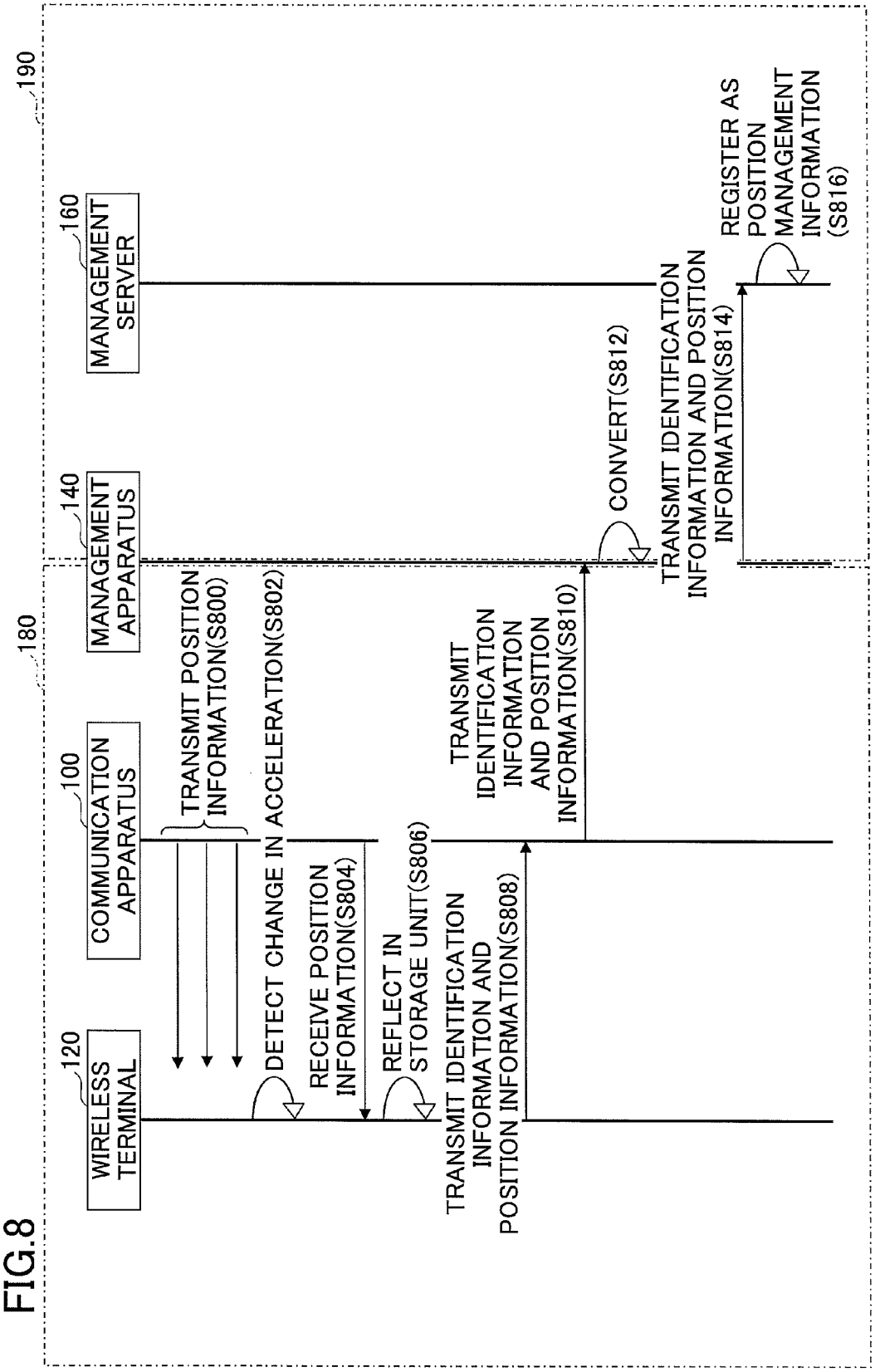

FIG.9A

| WHEREABOUTS SEARCH SYSTEM | |
|---|---|
| OWNING DEPARTMENT | EQUIPMENT NAME |
| SALES DEPARTMENT No.1 | PJ WX4310 |
| | UCS P3000 |
| | .. |
| SALES DEPARTMENT No.2 | .. |
| | PJ WX3231N No.1 |
| | PJ WX3231N No.2 |
| | PJ WX3231N No.3 |

EXECUTE SEARCH

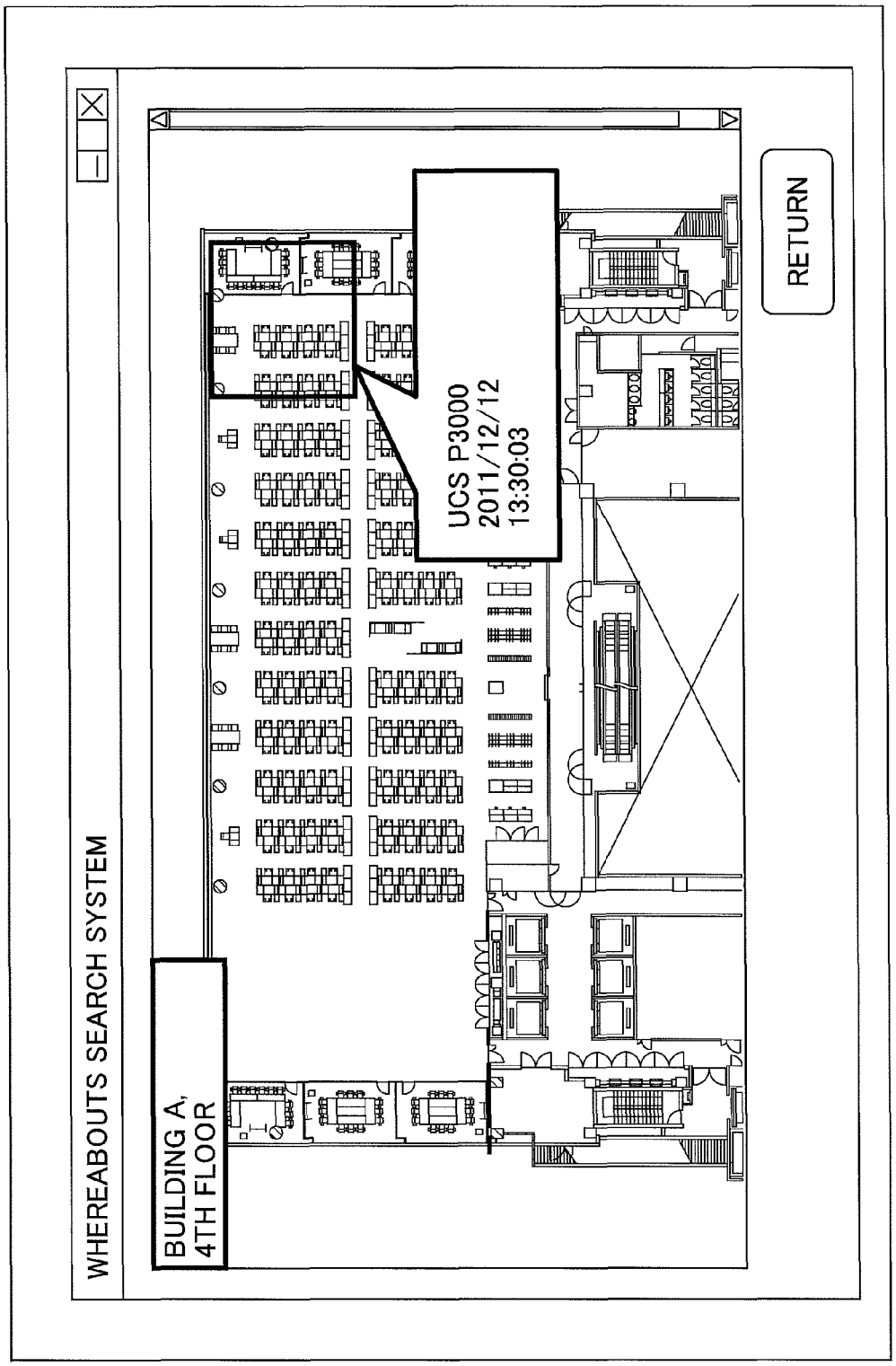

(a) (WHEN NOT INSTALLED)

(b) (WHEN INSTALLED)

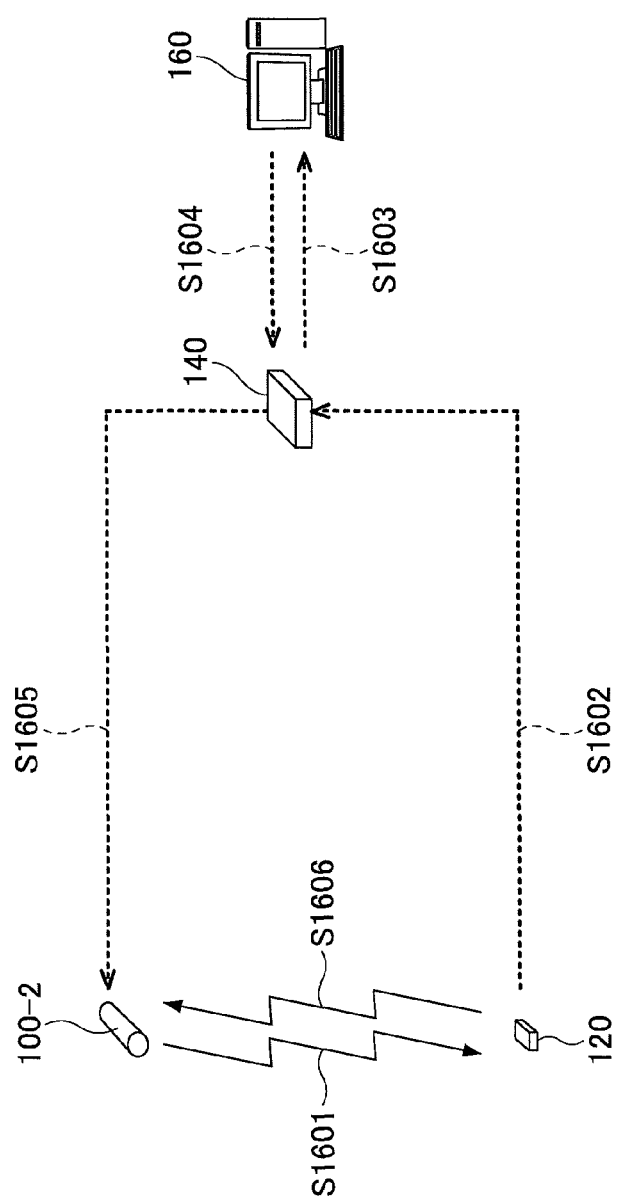

a# COMMUNICATION APPARATUS, POSITION INFORMATION MANAGEMENT SYSTEM, AND POSITION INFORMATION MANAGEMENT METHOD

TECHNICAL FIELD

The present invention relates to a communication apparatus, a position information management system, and a position information management method.

BACKGROUND ART

Various position information management systems are being proposed which grasp and manage a position of a wireless terminal, or a person or an article having the wireless terminal in a facility in which an accurate positioning using GPS, etc., is difficult.

Patent document 1 discloses a system in which a passive RF (Radio Frequency) tag attached to a person is read with a fixed RF (Radio Frequency) reader/writer and a position thereof is reported to a different wireless terminal, etc.

Patent document 2 discloses a system in which a wireless terminal converts an identifier which is wirelessly transmitted from a neighboring transmitter to position specifying information to specify an own position.

Patent document 3 discloses a system in which a wireless terminal receives specific information transmitted from a lighting apparatus and transmits the specific information to a server to specify a position of the wireless terminal.

However, with the system in Patent document 1, a large number of RF (Radio Frequency) reader/writers needs to be installed in order to read the passive RF (Radio Frequency) tag with a narrow range in which communications are possible, which may lead to higher cost in implementing the infrastructure.

Moreover, with the system in Patent document 2, power consumption of the wireless terminal may become high depending on a communications scheme between the wireless terminal and a server.

Furthermore, also in the system in Patent document 3, power consumption of the wireless terminal is not taken into account as in Patent document 2. Moreover, in a server, in order to specify the position of the wireless terminal, it is necessary to search a position associated with the specific information, which could lead to a higher computation cost.

PATENT DOCUMENTS

Patent document 1: JP4620410B
Patent document 2: JP2010-159980A
Patent document 3: WO2005/086375A

DISCLOSURE OF THE INVENTION

In light of problems as described above, an object of the present invention is to provide an efficient communication apparatus, position information management system, position information management method, etc.

According to an embodiment of the present invention, a communication apparatus which transmits information on a position at which the communication apparatus is positioned is provided, including: a detecting unit which detects one of a first signal which is detected when the communication apparatus is fixed to an installed location and a second signal which is detected when the communication apparatus is brought to a state in which it is not fixed to the installed location; a storage unit which stores therein the position information; and a control unit which erases the position information stored in the storage unit when the second signal is detected after the first signal is detected by the detecting unit.

Constituting elements, expressions, or an arbitrary combination of constituting elements of the present invention that are applied to a method, an apparatus, a system, a computer program, a recording medium, etc., are also effective as modes of the present invention.

Embodiments of the present invention may provide a communication apparatus, a position information management system, a position information management method, etc., which efficiently manage position information.

BRIEF DESCRIPTION OF THE DRAWINGS

Other objects, features, and advantages of the present invention will become more apparent from the following detailed descriptions when read in conjunction with the accompanying drawings, in which:

FIG. 2A is a hardware configuration diagram of a communication apparatus according to one embodiment of the present invention;

FIG. 2C is a hardware configuration diagram of a management apparatus according to one embodiment of the present invention;

FIG. 3B is a functional block diagram of the wireless terminal according to one embodiment of the present invention;

FIG. 3D is a functional block diagram of the management server according to one embodiment of the present invention;

FIG. 4 is a diagram showing an example of information held by the communication apparatus according to one embodiment of the present invention;

FIG. 5 is a diagram showing an example of information held by the wireless terminal according to one embodiment of the present invention;

FIG. 6 is a diagram showing an example of a format of position information transmitted by the wireless terminal according to one embodiment of the present invention;

FIG. 7 is a diagram showing an example of information held by the management server according to one embodiment of the present invention;

FIG. 8 is a diagram showing an operational sequence of the position information management system according to one embodiment of the present invention;

FIG. 9A is a diagram showing an example of a search screen of the management server according to one embodiment of the present invention;

FIG. 9B is a diagram showing an example of a search result screen of the management server according to one embodiment of the present invention;

FIG. 15 is a diagram showing an example of information held by the communication apparatus according to one embodiment of the present variation; and FIG. 16 is a diagram for describing a position information setting operation of a management server 160 according to the present variation.

BEST MODE FOR CARRYING OUT THE INVENTION

Embodiment 1

Below an embodiment of the present invention is described based on the drawings.

1. System
2. Exemplary hardware configuration
3. Function
4. Operational sequence (1. System)

Figure 1A:
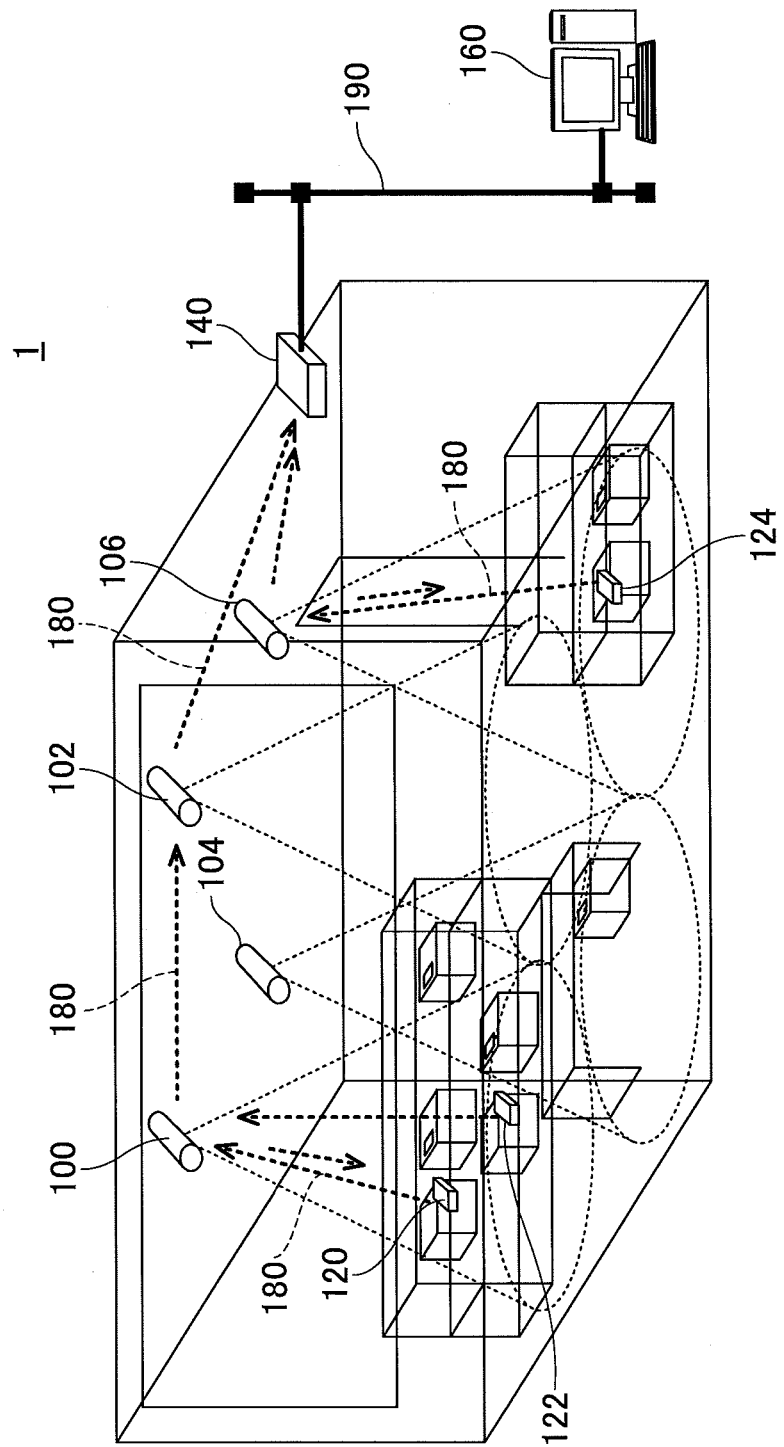
FIG. 1A is a diagram showing a position information management system according to one embodiment of the present invention.
Figure 1B:
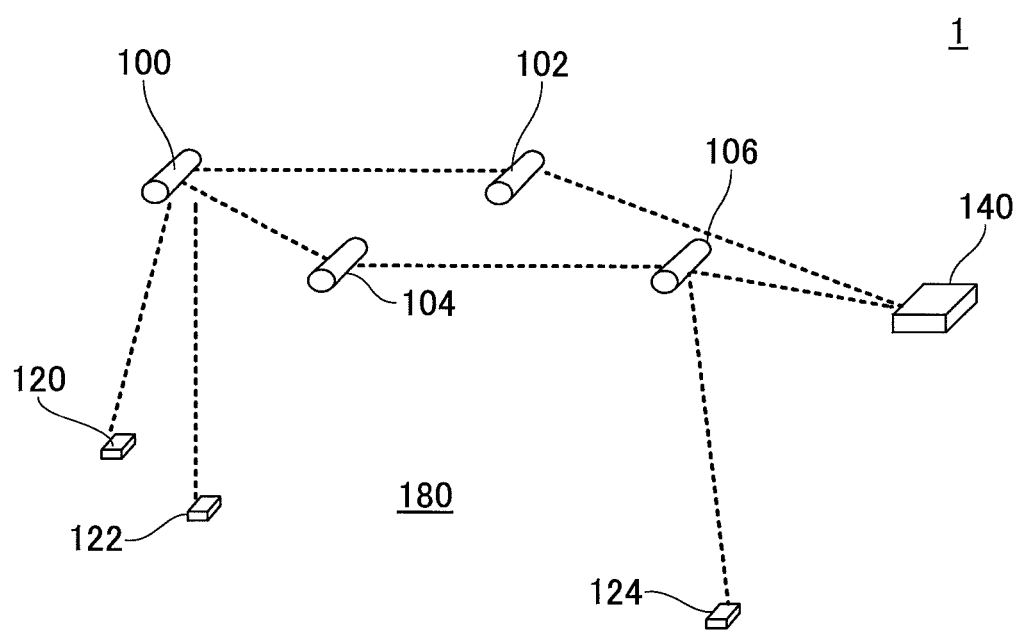
FIG. 1B is a diagram showing a network which makes up the position information management system according to one embodiment of the present invention.

FIG. 1A shows a position information management system 1 according to one embodiment of the present invention. In FIG. 1A are included communication apparatuses 100, 102, 104, 106; wireless terminals 120, 122, 124; a management apparatus 140; a management server 160; a network 180 which includes the communication apparatuses, the wireless terminals, and the management apparatus; and a network 190. Here, the network 180 is a wireless network managed by the management apparatus 140. FIG. 1B shows the communication apparatuses 100, 102, 104, and 106; the wireless terminals 120, 122, 124; and the management apparatus 140, which make up the wireless network in FIG. 1A, being extracted.

The communication apparatuses 100, 102, 104, and 106 that are fixed to a ceiling, etc., of a room, for example, continuously or intermittently transmit wirelessly position information (to be called "position information" below) such as latitude and longitude information, a building floor number, and a building number that is related to a position fixed. The communication apparatuses, which respectively include an independent housing, operate such that power thereof is supplied from a power supply installed in advance, or are embedded in a lighting fixture such as an LED fluorescent tube and operate such that power thereof is supplied from the lighting fixture. The communication apparatuses 100, 102, 104, and 106 transmit position information held respectively thereby to a predetermined range by a wireless signal. The predetermined range is determined by signal strength of a wireless signal used. The communication apparatuses are arranged to cover areas whose positions are to be managed and are configured such that the respective areas do not overlap. Alternatively, they are configured such that any one communication apparatus may be identified based on a strength of a received radio wave on the side which receives the position information even when they overlap. In an example in FIG. 1A, cylindrically-shaped dotted lines which are shown in a lower portion of the respective communication apparatuses show a predetermined range. As a communications scheme which transmits the position information, an indoor messaging system (IMES) may be used, for example.

The wireless terminals 120, 122, and 124 may receive a radio signal transmitted by a nearest communication apparatus out of the communication apparatuses 100, 102, 104, and 106. In the example in FIG. 1A, the respective wireless terminals are attached to a rectangular solid article whose position is to be managed. The wireless terminals 120, 122, and 124 are terminals such as an active tag, etc., which themselves can also transmit radio waves. Below, the wireless terminal 120 is described.

The wireless terminal 120, which is in a range in which a radio signal from the communication apparatus 100 may be received, receives position information of the communication apparatus 100. Receiving of the position information of the communication apparatus 100 is performed by IMES, for example. The wireless terminal 120 transmits to the communication apparatus 100, with position information received, information including own identification information such as a network address, for example. The transmitting is performed via the network 180 by near-field wireless communication such as IEEE 802.15.4 and ZigBee (registered copyright), for example. In this case, as the identification information for the wireless terminal 120, an IEEE extended (MAC) address or an IEEE 802.15.4 short address may be used. The identification information and the position information that are transmitted to the communication apparatus 100 are then transmitted to the management apparatus 140 via the neighboring communication apparatus 102. An operation of transmission and reception in the wireless terminal 120 is performed at a timing which is predetermined in the wireless terminal 120 or at a timing at which a change in acceleration is detected by an acceleration sensor included by the wireless terminal 120.

The management apparatus 140 mutually connects the network 180 and the network 190, and bridges, to the network 190, data transmitted from the network side 180. The management apparatus 140 is installed for each building floor, or for each room separated by a wall, etc., for example. When the network 180 is a PAN (Personal Area Network) by IEEE 802.15.4 and ZigBee (registered copyright) and the network 190 is a LAN based on IEEE 802.3 standards, conversion of communications schemes is performed therebetween. Moreover, when the identification information of the wireless terminal 120 is shown by the IEEE 802.15.4 short address, a conversion is made to the IEEE extended address based on information at the time of configuring the PAN, which converted results are transmitted to the management server 160.

The management server 160 records, with received date and time, the identification information and the position information that are received via the management apparatus 140 and manages a position of the communication apparatus. In the management server 160, an article to be managed that is related to the wireless terminal is recorded in advance. Therefore, these information sets may be used to search for whereabouts of the article to be managed.

The network 180 may be a PAN, which is configured by IEEE 802.15.4 and ZigBee (registered trademark) standards, for example, that connects the respective communication apparatuses 100, 102, 104, and 106; the wireless terminals 120, 122, and 124; and the management apparatus 140. When the PAN is configured by IEEE 802.15.4 and ZigBee (registered trademark) standards, the wireless terminal, the communication apparatus, and the management apparatus respectively include an end device function, a router function, and a coordinator function that are respectively determined by ZigBee (registered trademark) standards. Then, the communication apparatuses and the wireless terminals are subjected to control of the management apparatus at the time of launch, a PAN is configured, and a minimum route to the management apparatus is determined.

The network 190, which is a network connecting the management apparatus 140 and the management server 160, is a LAN determined by the IEEE 802.3 standards, for example.

As described above, in the position information management system 1 according to one embodiment of the present invention, the wireless terminal may use sufficient power to be able to communicate with a nearest communication apparatus to transmit the identification information and the position information to the management server. Moreover, construction of a new infrastructure for installing the communication apparatus is not necessary, making it possible to reduce implementation costs.

The position information of the communication apparatus may be provided via the network 180. In this way, a transmitting unit for transmitting the position information such as IMES becomes unnecessary.

Moreover, when the management apparatus 140 exists nearer relative to the communication apparatus which transmitted the position information, the wireless terminal may transmit the identification information and the position information to the management apparatus 140. In this way, the identification information and the position information may be transmitted to the management server 160 via a shortest route.

Furthermore, functions of the management apparatus 140 may be integrated into the management server 160. In this way, dedicated management apparatuses become unnecessary.

Moreover, the wireless terminal may be a wireless terminal which has an equivalent function as an active tag such as a smart phone, a PDA, a PC, or a smart meter. This makes it possible to manage position information of an existing wireless terminal without attaching a tag.

Furthermore, in addition to the above-described position information, information which specifies a more precise position may be included such as information which shows a section within a room, for example. This makes it possible to perform more precise position management.

Moreover, a target whose position is to be managed may be a person. This makes it possible to manage whereabouts of a person by the system 1.

Furthermore, the network 180 may be configured using a near-field wireless communications such as Bluetooth LE, ANT, Z-Wave, etc., for example. This makes it possible to manage the position information of various wireless terminals.

Moreover, the network 190 may include multiple types of networks such as the Internet, for example. This makes it possible to manage the position information of the wireless terminal regardless of a physical positioning between the network 180 and the management server 160.

Figure 1C:
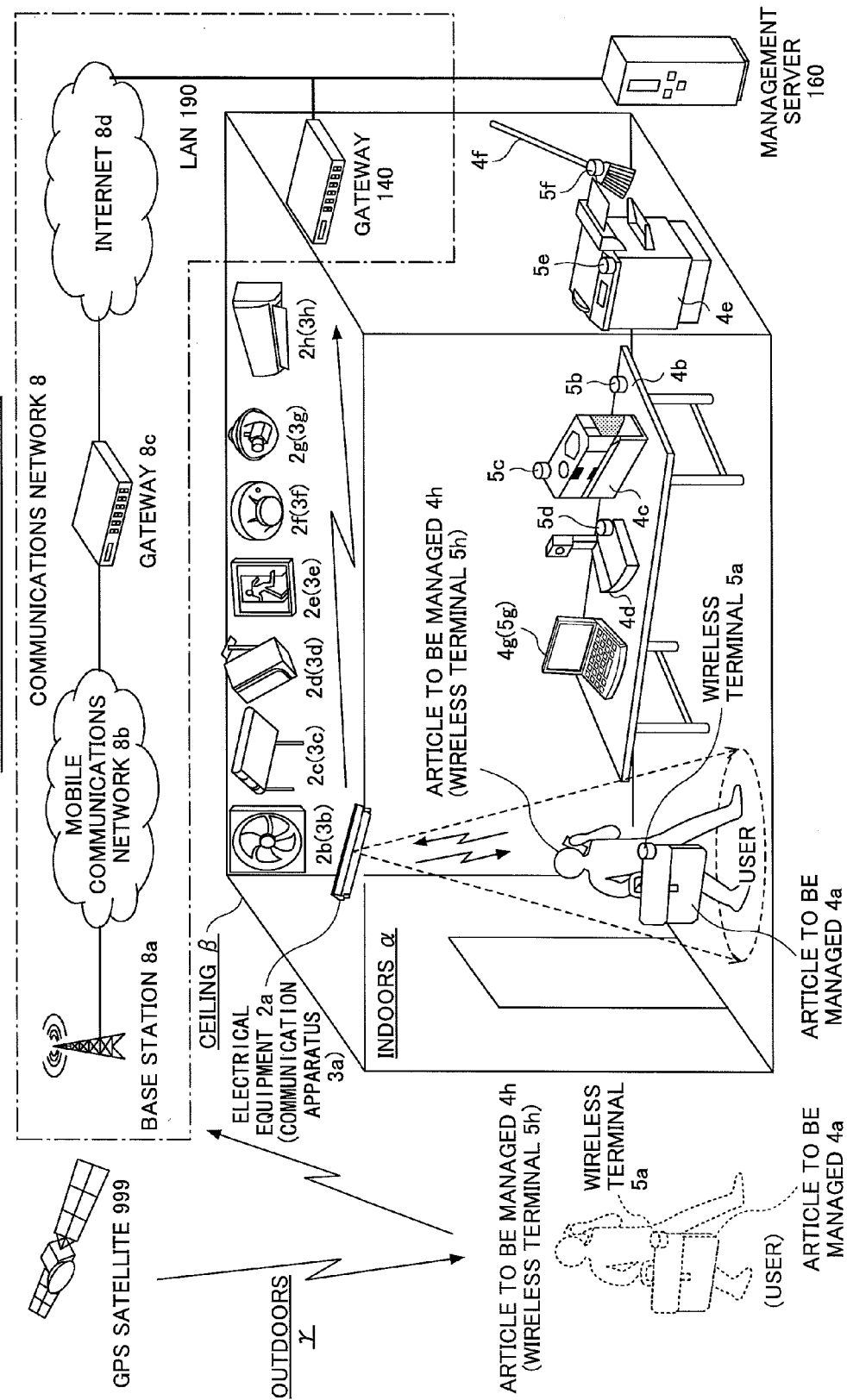
FIG. 1C is a diagram showing a second part of a position management system 1 according to one embodiment of the present invention.

FIG. 1C shows a second part of a position management system 1 according to one embodiment of the present invention. This is a diagram in which some features as shown below have been added relative to FIG. 1A, while the gist thereof is the same.

As shown in FIG. 1C, the second part of the position management system 1 according to the present embodiment is constructed with multiple communication apparatuses ($3a$, $3b$, $3c$, $3d$, $3e$, $3f$, $3g$, $3h$) on a ceiling β side of indoors α; and multiple wireless terminals ($5a$, $5b$, $5c$, $5d$, $5e$, $5f$, $5g$, $5h$) on a floor side of the indoors α; and the management server 160.

Moreover, the respective communication apparatuses ($3a$, $3b$, $3c$, $3d$, $3e$, $3f$, $3g$, $3h$) store therein position information sets (Xa, Xb, Xc, Xd, Xe, Xf, Xg, Xh) indicating positions at which the respective communication apparatuses are to be installed (after they are installed, it means "the installed position") and distribute the respective position information sets (Xa, Xb, Xc, Xd, Xe, Xf, Xg, Xh) to the floor of the indoors α.

On the other hand, the respective wireless terminals ($5a$, $5b$, $5c$, $5d$, $5e$, $5f$, $5g$, $5h$) store therein terminal identification information sets (Aa, Ab, Ac, Ad, Ae, Af, Ag, Ah) for identifying the respective wireless terminals. Of the multiple identification information sets, an arbitrary identification information set is indicated as "identification information A". The identification information A includes an MAC address. When position information X is received from the communication apparatus 3, each of the wireless terminals 5 transmits, to the respective communication apparatus 3, the position information X together with own identification information A.

Moreover, the respective communication apparatuses 3 are respectively embedded in electrical equipment units ($2a$, $2b$, $2c$, $2d$, $2e$, $2f$, $2g$, $2h$) installed on the ceiling β of the indoors α or onto the outside thereof. Below, an arbitrary electrical equipment unit of the multiple electrical equipment units is shown as "an electrical equipment unit 2".

The respective electrical equipment units 2 supply electric power to the respective communication apparatuses 3. Of these, the electrical equipment unit $2a$ is a fluorescent light-type LED (light emitting diode) lighting fixture. The electrical equipment unit $2b$ is a ventilating fan. The electrical equipment unit $2c$ is an access point for a wireless LAN (local area network). The electrical equipment unit $2d$ is a speaker. The electrical equipment unit $2e$ is an emergency light. The electrical equipment unit $2f$ is a fire detector or a smoke detector. The electrical equipment unit $2g$ is a surveillance camera. The electrical equipment unit $2h$ is an air conditioner.

The respective electrical equipment units 2 may be articles other than articles shown in FIG. 1C as long as they can supply power to the respective communication apparatuses 3. For example, besides the above-described examples of the electrical equipment units 2, they may include a conventional fluorescent light or incandescent light lighting fixture that is not an LED; a crime prevention sensor, which detects an intrusion of a person from outside, etc.

On the other hand, the respective wireless terminals 5 are installed on the outside of articles to be managed ($4a$, $4b$, $4c$, $4d$, $4e$) whose positions are managed by the management server 160.

Of these, the article to be managed $4a$ is a bag. The article to be managed $4b$ is a table. The article to be managed $4c$ is a projector. The article to be managed $4d$ is a teleconferencing terminal. The article to be managed $4e$ is a multi-functional product (MFP) which includes a copying function. The article to be managed $4f$ is a broom.

Moreover, the article to be managed $4g$ is a personal computer in which functions of the wireless terminal 5 are installed, in which case it is also the wireless terminal $5g$. Furthermore, the article to be managed $4h$ is a cell phone such as a smart phone, etc., and functions of the wireless terminal 5 are installed within the cell phone, in which case it is also the wireless terminal 5h. Below, an arbitrary article to be managed of the multiple articles to be managed is shown as "the article to be managed 4".

Moreover, the respective articles to be managed 4 may be articles other than those shown in FIG. 1C. For example, other examples of the article to be managed 4 include a facsimile apparatus, a scanner, a printer, a copying machine, an electronic blackboard, an air cleaner, a shredder, an automatic vending machine, a wrist watch, a camera, a gaming machine, a wheel chair, a medical equipment unit such as an endoscope, etc.

Next, an overview of one example of a method of managing position information using the position information management system 1 is described. For example, according to the present embodiment, the communication apparatus 3a which is installed on the ceiling β of the indoors α distributes, by wireless communications, the position information Xa, which indicates a position at which this communication apparatus 3a is installed. In this way, the wireless terminal 5a receives the position information Xa. Next, the wireless terminal 5a transmits, to the communication apparatus 3a by wireless communications, the position information Xa and the identification information Aa for identifying the wireless terminal 5a. In this case, the wireless terminal 5a is to send back, to the communication apparatus 3a, the position information Xa received from the communication apparatus 3a.

In this way, the communication apparatus 3a receives the position information Xa and the identification information Aa of the terminal. Next, the communication apparatus 3a transmits, by wireless communications to a gateway 140, the position information Xa and the identification information Aa of the terminal. Then, the gateway 140 transmits the position information Xa and the identification information Aa of the terminal to the management server 160 via a LAN network 190. The position information Xa and the identification information Aa of the terminal can be managed in the management server 160 for an administrator of the position information management system 1 to grasp a position in indoors α of the wireless terminal 5a (the article to be managed 4a).

Moreover, as shown in FIG. 1C, of the wireless terminals 5, the wireless terminals (5g, 5h), in particular, may receive, in outdoors γ, a wireless signal (time information, orbit information, etc.) from a GPS (global positioning satellite) 999 to calculate a position on the globe. Then, the wireless terminals (5g, 5h) may also transmit the position information (Xg, Xh) and the identification information (Ag, Ah) for respectively identifying the wireless terminals (5g, 5h) to the management server 160 via a base station 8a, a mobile communications network 8b, a gateway 8c, the Internet 8d, and the LAN network 190 using a mobile communications system such as 3G (3rd generation), 4G (4th generation), etc.

The communications network 8 is constructed with the base station 8a, the mobile communications network 8b, the gateway 8c, the Internet 8d, the LAN network 190, and the gateway 140. Moreover, while at least three GPS satellites are needed (four are needed if altitude is included) in order for latitude and longitude on the globe to be determined, one GPS satellite is shown in FIG. 1C for brevity of explanations.

(2. Exemplary Hardware Configuration)

Next, a hardware configuration of the communication apparatus 100, the wireless terminal 120, the management apparatus 140, and the management server 160 that are included in the position information management system 1 are described using FIGS. 2A, 2B, 2C, and 2D.

FIG. 2A shows a hardware configuration of the communication apparatus 100 according to one embodiment of the present invention. The communication apparatus 100 includes a CPU 200, a RAM 202, a ROM 204, a position signal transmission control unit 206, a position signal transmitter 208, a wireless communications control unit 210, a wireless communication apparatus 212, and a bus 214.

The CPU 200 executes programs which perform operational control of the communication apparatus 100. The RAM 202 makes up a work area, etc., of the CPU 200. In addition to the program executed by the CPU 200, the ROM 204 stores position information of the communication apparatus 100. The position signal transmission control unit 206 executes a process for transmitting a positioning signal which shows position information of the communication apparatus 100 via the position signal transmitter 208. The position signal transmitter 208 is an apparatus which includes an antenna for sending a positioning signal such as an IMES, for example. The wireless communications controller 210 executes a wireless communications process via the wireless communication apparatus 212. The wireless communication apparatus 212 is an apparatus including an antenna which can transmit and receive a radio wave which is adapted to IEEE 802.15.4 standards, for example. The bus 214 is electrically connected to the apparatus.

With the above-described configuration, the communication apparatus 100 according to one embodiment of the present invention may transmit the position information to the wireless terminal 120, receive the identification information and the position information from the wireless terminal 120, and transmit these information sets to the management server 160 via the management apparatus 140.

As described above, when the position information is transmitted by wireless communications, the position signal transmission controller 206 and the position signal transmitter 208 become unnecessary.

Figure 2B:
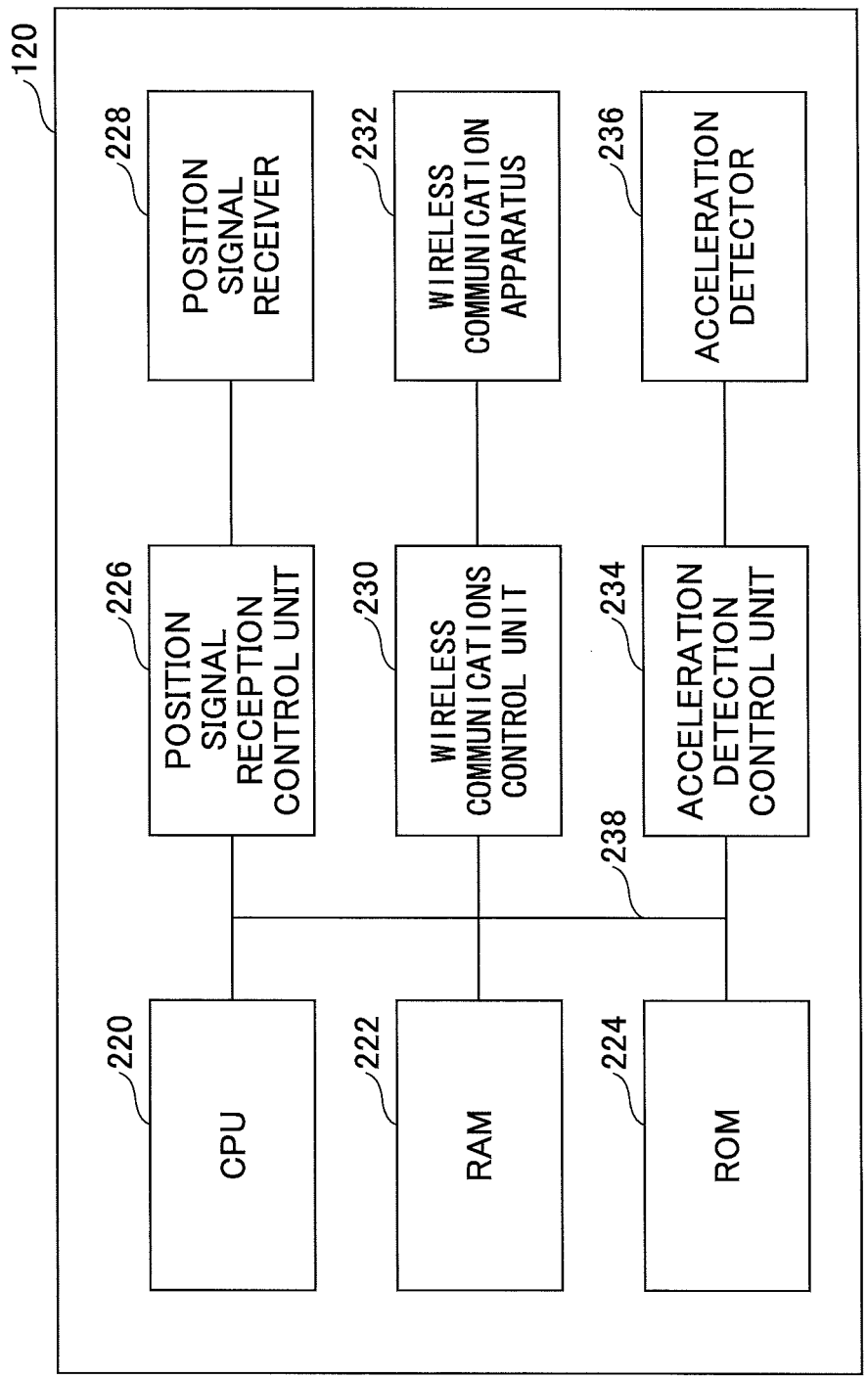
FIG. 2B is a hardware configuration diagram of a wireless terminal according to one embodiment of the present invention.

FIG. 2B shows a hardware configuration of the wireless terminal 120 according to one embodiment of the present invention. The communications terminal 120 includes a CPU 220, a RAM 222, a ROM 224, a position signal reception controller 226, a position signal receiver 228, a wireless communications control unit 230, a wireless communication apparatus 232, an acceleration detection control unit 234, an acceleration detector 236, and a bus 238.

The CPU 220 executes programs which perform operational control of the wireless terminal 120. The RAM 222 makes up a work area, etc., of the CPU 220. In addition to programs executed by the CPU 220, the ROM 224 stores the identification information of the wireless terminal 120 and the position information received from the communication apparatus 100. The position signal reception control unit 226 executes a process for receiving a positioning signal which shows position information via the position signal receiver 228. The position signal receiver 228 is an apparatus including an antenna which receives a positioning signal such as IMES, for example. The wireless communications control unit 230 executes a wireless communications process via the wireless communication apparatus 232. The wireless communication apparatus 232 is an apparatus including an antenna which can transmit and receive a radio wave which is adapted to IEEE 802.15.4 standards, for example. The acceleration detection control unit 234 detects a change in acceleration via the acceleration detector 236. The acceleration detector 236 is a motion sensor which uses an inertial force or magnetism or an acceleration sensor, for example. The bus 238 electrically connects the above-described apparatuses.

With the above-described configuration, the wireless terminal 120 according to one embodiment of the present invention may receive the position information from the communication apparatus 100 and transmit, to the communication apparatus 100, own identification information and the position information. In particular, a transmission or reception operation may be performed at a timing at which the wireless terminal 120 is moved to efficiently transmit the identification information and the position information.

When the wireless terminal 120 is an information terminal such as a smart phone or a PC, there may be provided an input apparatus such as a touch panel, a dial key, a keyboard, a mouse, for example, that accepts an input from a user and an input controller which corresponds thereto. Moreover, there may be provided a display apparatus such as a screen and a corresponding display controller.

Moreover, when the wireless terminal 120 includes a GPS antenna and a corresponding control unit, it may receive a positioning signal using IMES using the antenna and cause it to correspond to the position information management system 1 by only software improvement.

Moreover, the acceleration detection controller 234 and the acceleration detector 236 are arbitrary constituting elements. Without the acceleration detection controller 234 and the acceleration detector 236, an operation of transmission or reception of the wireless terminal 120 is performed at a predetermined interval or time.

Moreover, as described above, when the position information is received by wireless communications, the position signal reception control unit 206 and the position signal receiver 208 become unnecessary.

FIG. 2C shows a hardware configuration of the management apparatus 140 according to one embodiment of the present invention. The management apparatus 140 includes a CPU 240, a RAM 242, a ROM 244, a wireless communications control unit 246, a wireless communication apparatus 248, a wired communications control unit 250, a wired communication apparatus 252, and a bus 254.

The CPU 240 executes programs which perform operational control of the management apparatus 140. The RAM 242 makes up a work area, etc., of the CPU 240. The ROM 244 stores the programs to be executed by the CPU 240 and data to be used by the programs. The wireless communications control unit 246 executes the wireless communications process via the wireless communication apparatus 248. The wireless communication apparatus 248 is an apparatus including an antenna which can transmit and receive a radio wave which is adapted to IEEE 802.15.4 standards, for example. The wired communications control unit 250 executes a communications process in a wired manner via the wired communication apparatus 252. The wired communication apparatus 252 is an apparatus which has a network interface which is adapted to the IEEE 802.3 standards, for example. The bus 254 electrically connects the apparatuses.

With the above-described configuration, the management apparatus 140 according to one embodiment of the present invention may convert a signal from the network 180 which includes the communication apparatus 100 and the wireless terminal 120 into the network 190 which includes the management server 160. Moreover, when the network 180 which makes up the PAN is ZigBee (registered trademark), it may include a function of a coordinator which manages devices which participate in the PAN.

Figure 2D:
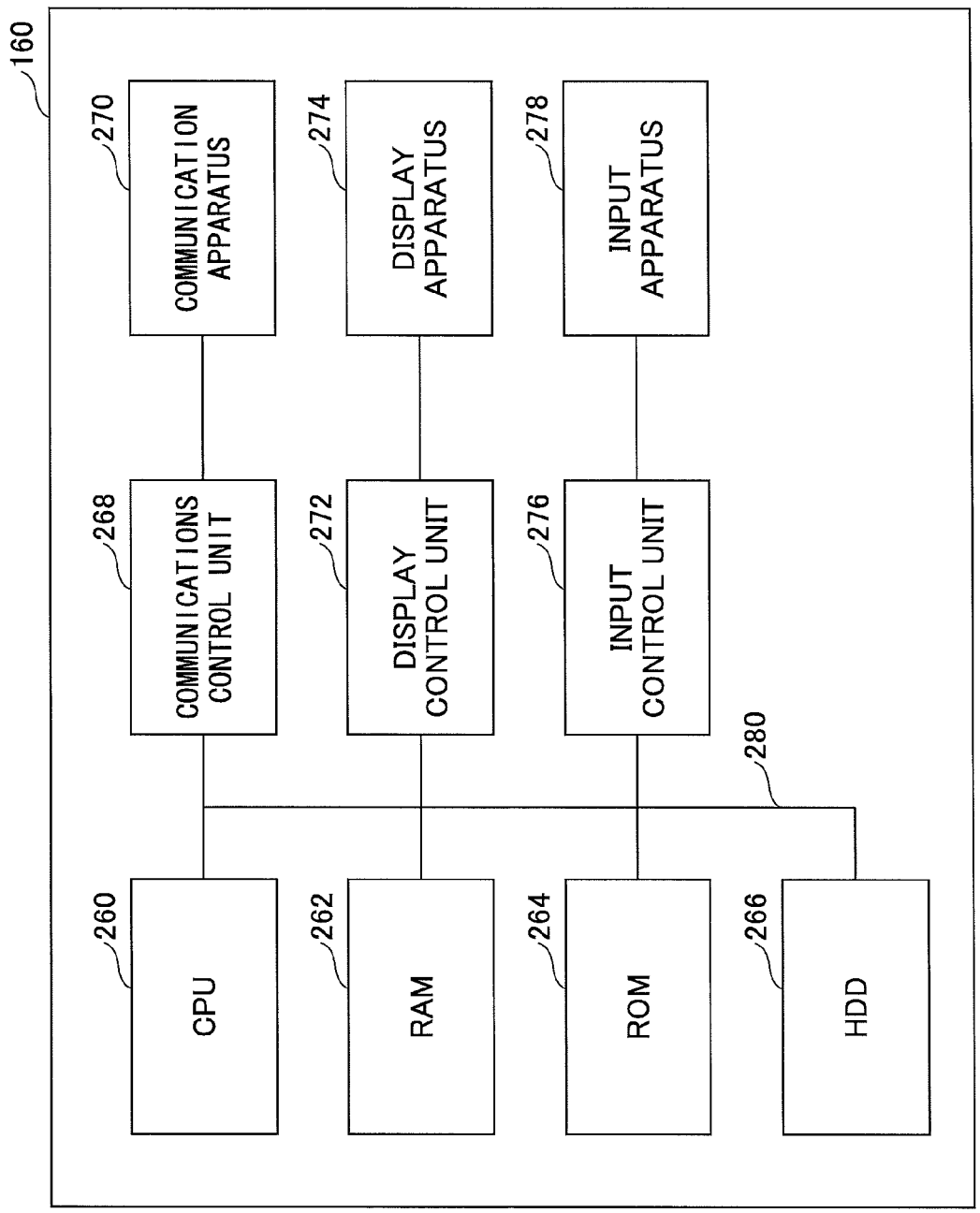
FIG. 2D is a hardware configuration diagram of a management server according to one embodiment of the present invention.

FIG. 2D shows a hardware configuration of the management server 160 according to one embodiment of the present invention. The management server 160 includes a CPU 260, a RAM 262, a ROM 264, an HDD 266, a communications control unit 268, a communication apparatus 270, a display control unit 272, a display apparatus 274, an input control unit 276, an input apparatus 278, and a bus 280.

The CPU 260 executes programs which perform an operational control of the management server 160. The RAM 262 includes a work area, etc., of the CPU 260. The ROM 264 stores programs to be executed by the CPU 260 and data to be used by the programs. The HDD 266 stores information for managing a position of the wireless terminal 120 which is used in the position information management system 1. The communications control unit 268 executes a communications process via the communication apparatus 270. The communication apparatus 270 is an apparatus which includes a network interface which is adapted to IEEE 802.3 standards, for example. The display control unit 272 controls what is to be displayed on the display apparatus 274 according to processing of programs related to position management that are executed on the management server 160. The display apparatus 274 includes a display such as a liquid crystal display or a CRT display, for example. The input control unit 276 processes a signal from the input apparatus 278 such as a keyboard, a mouse, etc., that accepts an input from the user. The bus 280 electrically connects these components.

With the above-described configuration, the management server 160 according to one embodiment of the present invention may manage a position of the wireless terminal 120 and search for whereabouts of the wireless terminal 120.

The HDD 266 may be any storage apparatus including a tape drive, or it may be a storage area which can be accessed via a network.

Moreover, the management server 160 may include a wireless communications control unit and a wireless communication apparatus normally included in the management apparatus 140, and a process thereof may be performed in lieu of the management apparatus 140. This makes it unnecessary to separately provide the management apparatus 140.

(3. Function)

Figure 3A:
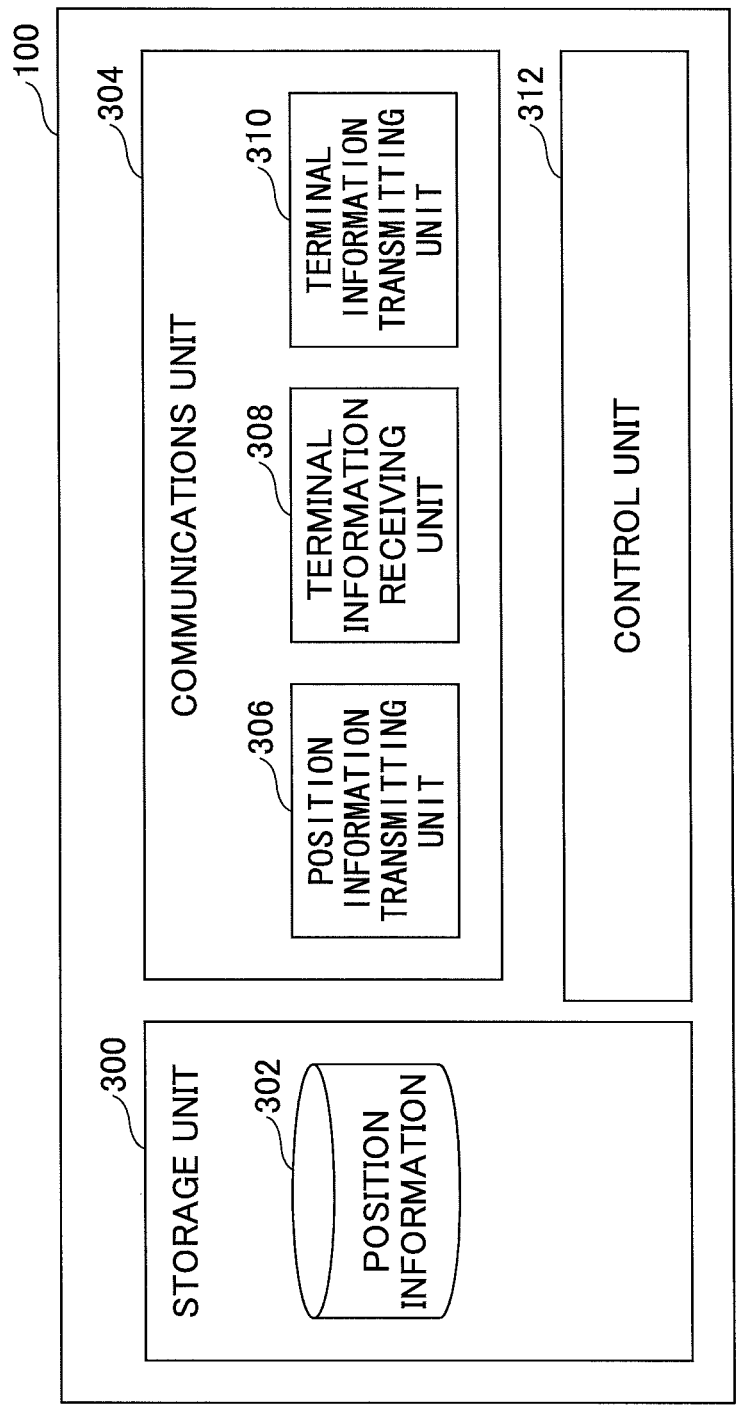
FIG. 3A is a functional block diagram of the communication apparatus according to one embodiment of the present invention.

FIG. 3A shows a functional block diagram of the communication apparatus 100 according to one embodiment of the present invention. The communication apparatus 100 according to one embodiment of the present invention includes a storage unit 300, a communications unit 304, and a control unit 312.

The storage unit 300 stores position information 302 of the communication apparatus 100. An example of a table for storing the position information 302 is shown in FIG. 4. FIG. 4 includes items of the floor number, latitude, longitude, and building number. The floor number shows a floor number of a building on which the communication apparatus 100 is installed. The latitude and the longitude show a latitude and a longitude of a position at which the communication apparatus 100 is located. The building number shows a building number of a building in which the communication apparatus 100 is installed. In an example in FIG. 4, the communication apparatus 100 is located on the 16th floor of a C unit of a certain building and is located at a position which is 35.459555 in latitude and 139.387110 in longitude.

The communications unit 304 includes a position information transmitting unit 306, a terminal information receiving unit 308, and a terminal information transmitting unit 310.

The position information transmitting unit 306 wirelessly transmits in a continuous or intermittent manner, to the wireless terminal 120 in a predetermined range, the position information 302 including information such as latitude and longitude information, the floor number in a building, the building number. The position information 302 is transmitted using a format specified in IMES, for example.

The terminal information receiving unit 308 receives identification information and position information transmitted from the wireless terminal 120.

The terminal information transmission unit 310 transmits, to the management server 160 via the management apparatus 140, the identification information and the position information transmitted from the wireless terminal 120. When the network 180 is provided using ZigBee (registered trademark) standards, the transmission is performed using routing information held by the communication apparatus 100.

The control unit 312 controls an operation of the communication apparatus 100. When the communication apparatus 100 configures a PAN using ZigBee (registered trademark) with the management apparatus 140 and the wireless terminal 120, the control is performed such that the communication apparatus 100 provides a router function.

With the above-described configuration, the communication apparatus 100 according to one embodiment of the present invention may hold position information 302, transmit the position information 302 to the wireless terminal 120, and receive the position information and the identification information of the wireless terminal 120 to transmit the identification information to the management server via the management apparatus 140.

The position information 302 may include additional information such as information showing a section within a room and a name of a building in which a communication apparatus 100 is installed. This makes it possible to perform more precise position management.

FIG. 3B shows a functional block diagram of the wireless terminal 120 according to one embodiment of the present invention. The wireless terminal 120 according to one embodiment of the present invention includes a storage unit 320, a communications unit 326, an acceleration detection unit 332, and a control unit 334.

The storage unit 320 includes identification information 322 and position information 324. The identification information 322 includes information which can specify the wireless terminal 120 on the position information management system 1, such as a network address of the wireless terminal 120. For example, when the network 180 is based on IEEE 802.15.4 and ZigBee (registered trademark) standards, the IEEE 802.15.4 short address or the IEEE extended (MAC) address may be used. The position information 324 is position information 302, which is transmitted from the communication apparatus 100. An example of a table for storing therein the position information 324 is shown in FIG. 5. The configuration is the same as that in FIG. 4.

The communications unit 326 includes the position information receiving unit 328 and the identification information transmitting unit 330.

The position information receiving unit 328 receives the position information 302 transmitted from the communication apparatus 100. The position information 302 received is held in the storage unit 320 of the wireless terminal 120.

The identification information transmitting unit 330 transmits, to the communication apparatus 100, the position information 324 with the identification information 322 of the wireless terminal 120. The position information 322 is transmitted to the wireless terminal 120 by a format as in FIG. 6, for example. In a format in FIG. 5, respective fields of the floor number, the latitude, the longitude, and the building number that are expressed with 9, 21, 21, and 8 bits, respectively, are formed such that they are linked to an applicable field of a message received according to the IMES standards. An expression format of each field conforms to the IMES standards. In practice, in addition to this format, checksum information and headers which are specified in accordance with communications schemes are added for transmission. As the communications schemes, IEEE 802.15.4 and ZigBee (registered copyright) standards are used, for example.

The acceleration detection unit 332 detects a change in acceleration of the wireless terminal 120. The change in acceleration is detected when the wireless terminal 120 starts a movement, when the movement is stopped, or when a slope is detected. The detected change in the acceleration is used for determining a timing of an operation of transmitting or receiving of the wireless terminal 120. The acceleration detection unit 332 is an arbitrary constituting element.

The control unit 334 controls a timing of receiving position information by the position information receiving unit 228 and a timing of transmitting the position information 324 and the identification information 322 by the identification information transmitting unit 330. The timings of transmitting and receiving are determined based on detection of a change in acceleration by the acceleration detecting unit 332. Alternatively, it may be determined based on an interval or a time set in advance to the wireless terminal 120. Moreover, the timings of transmitting and receiving may be determined independent of each other. Furthermore, when the wireless terminal 120 configures the PAN by ZigBee (registered trademark) with the communication apparatus 100 and the management apparatus 140, control is performed such that the wireless terminal 120 provides an endpoint function.

With the above-described configuration, the wireless terminal 120 according to one embodiment of the present invention efficiently receives position information from a communication apparatus and efficiently transmit it with the other information to the identification information communication apparatus.

When the wireless terminal 120 is an information terminal such as a smart phone or a PC, an input unit which accepts an input from a user or a display unit which presents information to the user may be provided. This makes it possible to present identification information or position information to the user and to input or modify identification information or position information from the user.

Figure 3C:
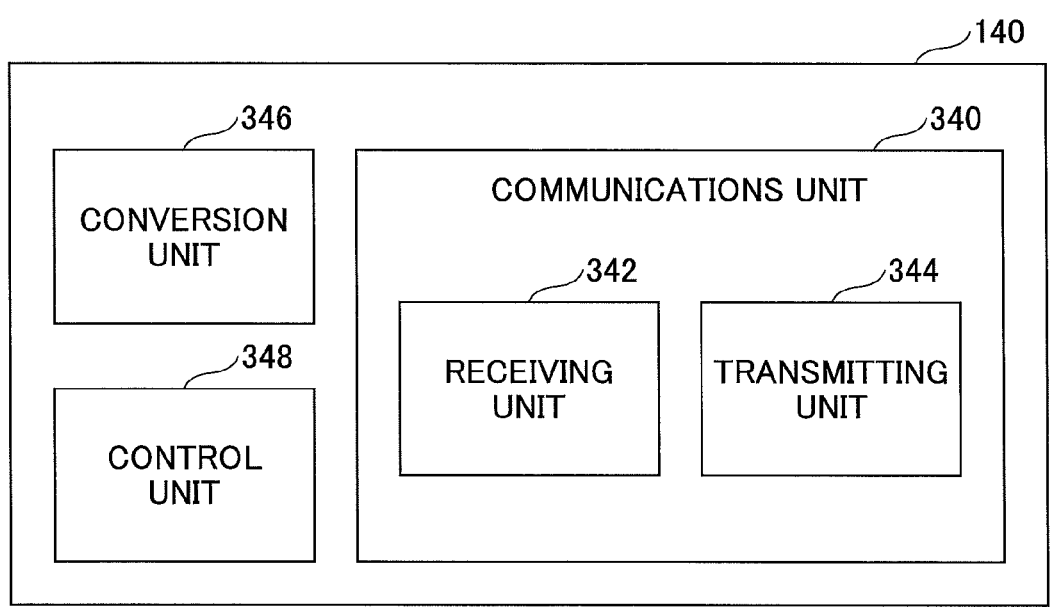
FIG. 3C is a functional block diagram of the management apparatus according to one embodiment of the present invention.

FIG. 3C is a functional block diagram of the management apparatus 140 according to one embodiment of the present invention. The management apparatus 140 in one embodiment of the present invention includes a communications unit 340, a conversion unit 346, and a control unit 348.

The communications unit 340 includes a receiving unit 342 and a transmitting unit 344. The receiving unit 342 receives data transmitted from the wireless terminal or the communication apparatus which belongs to the network 180. The transmitting unit 344 transmits the data converted in the management apparatus 140 to the management server 160 which belongs to the network 190. The network 180 is a PAN based on IEEE 802.15.4 and ZigBee (registered trademark) standards, for example. Moreover, the network 190 is a LAN based on IEEE 802.3 standards, for example.

The conversion unit 346 converts data received from the network 180 by the receiving unit 342 to a format which is adapted to the network 190. The converted data are transmitted to the management server 160 via the network 190 by the transmitting unit 344. Here, when the identification information of the wireless terminal 120 that is included in the data is expressed in the IEEE 802.15.4 short address, it is converted to an IEEE extended address based on information at the time of configuring the PAN.

The control unit 348 controls an operation of the management apparatus 140. When the management apparatus 140 configures a PAN by ZigBee (registered trademark) standards with the communication apparatus 100 and the wireless terminal 120, control is performed such that the management apparatus 140 provides a coordinator function.

With the above-described configuration, the management apparatus 140 according to one embodiment of the present invention may bridge communications between the network 180 to which the communication apparatus 100 and the wireless terminal 120 belong and a network 190 to which the management server belongs.

FIG. 3D shows a functional block diagram of the management server 160 according to one embodiment of the present invention. The management server 160 according to one embodiment of the present invention includes a communications unit 360, a storage unit 366, an input unit 370, a display unit 372, and a control unit 374.

The communications unit 360 includes a receiving unit 362 and a transmitting unit 364. The receiving unit 362 receives identification information and position information transmitted from the wireless terminal through the management apparatus 140. The received identification information and position information are stored in the storage unit 366. When requested to provide the position information to an external server, etc., the transmitting unit 364 transmits the position information to the external server, etc.

The storage unit 366 includes position management information 368. The position management information 368 is information in which management information such as received time, etc., is added to the identification information and the position information that are received from the wireless terminal 120. An example of a table storing therein the information is shown in FIG. 7. FIG. 7 includes items of identification information, equipment name, owning department, latitude, longitude, floor number, building, and received date/time. Identification information is information such as an IEEE extended address, for example, of the wireless terminal 120 which transmitted the identification information. The latitude, longitude, floor number, and the building correspond to the position information received with the identification information. The received date/time are date and time at which the management server 160 received the information. The equipment name is a name of an equipment unit of the wireless terminal 120 or a name of a unit to be managed that is assigned to the wireless terminal 120 which transmitted the information. The owning department is a name of a department which owns the wireless terminal 120 which transmitted the information. The information of the equipment name and the owning department are associated with the identification information by the management server 160 in advance.

In order for a user to search for the position information, the input unit 370 accepts an input from the user.

The display unit 372 displays, on a screen, a GUI related to a search screen for the user to search for the position information. An example of the search screen is shown in FIG. 9A. In "a whereabouts search system" shown in FIG. 9A, an owning department and an equipment name that are related to the wireless terminal are displayed in a list on a screen based on information stored in the storage unit 366. When the user selects via the input unit 370 a check box for an equipment unit to be searched for, a check mark is assigned. When "a search execution" button is selected after placing check marks for all equipment units to be searched for, a search is executed, switching to a screen for displaying results. In an example in FIG. 9A, an example in which a user executes a search is shown for an equipment unit of "UCS P3000", which is owned by "Sales No. 1 Department". FIG. 9B is an example of a screen of the search results. When "a search execution" button is selected, based on data stored in the storage unit 366, the display unit 372 displays a floor plan of "A building 4th floor" on which "UCS P3000" is located, a name of an equipment unit thereof, and received date/time.

The control unit 374 controls an operation of the management server 160.

With the above-described configuration, the management server 160 according to one embodiment of the present invention may manage a position of the wireless terminal and search for whereabouts thereof. In particular, information itself which shows the position itself of the wireless terminal may be received directly to manage it, making it possible to reduce a computational complexity associated with the search for the position.

The management server 160 may include the same functions as those of the receiving unit 342, the control unit 348, and the conversion unit 346 included by the management apparatus 140 and may include the same functions as the management apparatus 140. This makes it unnecessary to individually provide the management apparatus 140.

Moreover, the position management information 368 which is stored by the management server 160 may store information including an electric field strength or a time taken for arrival of information, identifier of management apparatus or communication apparatus passed through, and date/time at which the wireless terminal transmitted the information, together with or in lieu of information shown in FIG. 7. In this way, position information may be managed under more precise conditions.

Moreover, the management server 160 may record previous position information of the wireless terminal. In this way, a movement of the wireless terminal may be tracked.

(4. Operational Sequence)

FIG. 8 is a diagram showing an operational sequence of the position information management system 1 according to one embodiment of the present invention in a configuration in FIGS. 1A and 1B. In FIG. 8 is shown an example which includes the communication apparatus 100 which, upon sensing a change in acceleration, receives the position information and transmits the identification information; the wireless terminal 120 which transmits the position information to an area to which the communication apparatus 100 belongs; the management apparatus 140 which bridges a PAN (IEEE 802.15.4 and ZigBee (registered copyright)) and a LAN (IEEE 802.3); and the management server 160. The PAN between the communication apparatus 100, the wireless terminal 120, and the management apparatus 140 is to be already established.

In step S800, the communication apparatus 100 consecutively or intermittently transmits the position information using IMES, etc.

In step S802, the wireless terminal 120 senses a change in acceleration.

In step S804, the wireless terminal 120 receives the position information transmitted from the communication apparatus 100.

In step S806, the wireless terminal 120 stores the position information received.

In step S808, the wireless terminal 120 transmits the identification information and the position information to the communication apparatus 100.

In step S810, the communication apparatus 100 transmits the identification information and the position information received from the wireless terminal 120 to the management apparatus 140 via a minimum route.

In step S812, the management apparatus 140 converts data transmitted from the network 180 that include the identification information and the position information received from the communication apparatus 100 to a format adapted to the network 190.

In step S814, the management apparatus 140 transmits, to the management server 160, the identification information and the position information that are converted to a format adapted to the network 190.

In step S816, the management server 160 registers the identification information and the position information received from the management apparatus 140, together with information on the wireless terminal that corresponds to the identification information.

With the above-described procedure, in the position information management system 1 according to one embodiment of the present invention, a wireless terminal may efficiently transmit the identification information and the location information to a nearby communication apparatus to suppress power consumption of the wireless terminal.

As described above, the management server 160 may execute a function of the management apparatus 140 in an integrated manner. In this case, it becomes unnecessary to separately install the management apparatus 140.

Moreover, when the wireless terminal is not provided with the acceleration detecting unit 332, step S802 is not executed and reception of the position information in step S804 may be performed at a predetermined time or a predetermined interval. The subsequent process is the same as in steps S806-S816.

(Variation 1)

Next, on the basis of the above-described embodiment, variations will be described. Below, the communication apparatus 100 will be referred to. However, the same applies to the above-described communication apparatuses 102, 104, and 106, which are the communication apparatuses.

In the above-described embodiment, as shown in FIG. 3A, the communication apparatus 100 stores, in the storage unit 300 (the ROM 204), position information of the communication apparatus 100, for example. Moreover, the position information 302 includes items of floor number, latitude, longitude, building number, for example (see FIG. 4, for example).

Then, this position information 302 is to be eventually used for specifying a position at which the wireless terminal 120 resides on the management server 160 via wireless transmission, etc., to the wireless terminal 120 within a predetermined range.

Therefore, in order to secure accuracy of a position at which the wireless terminal 120 resides, or, in other words, accuracy of position information which the communication apparatus 100 has, it is necessary that accuracy of the position information 302 stored (held) in the storage unit 300 of the communication apparatus 100 be secured in a relationship with a position at which the communication apparatus 100 is actually installed. In other words, relative to the position at which the communication apparatus 100 is actually installed, the communication apparatus 100 needs to output, at an installed position at which the communication apparatus 100 is installed, the position information 302 which is first set by an administrator, etc., and stored (held) in the storage unit 300.

Thus, for example, the communication apparatus 100, in a state in which it remains installed at the installed position thereof, must not output a different position information, and, when the communication apparatus 100 is installed at (moved to) a different installed position, the communication apparatus 100 has to output position information which indicates a new installed position after moving.

More specifically, while a case in which the communication apparatus 100 which is installed on the ceiling, etc., cannot be removed does not apply; however, if the communication apparatus 100 which was once installed can be removed relatively easily, or, for example, if the administrator, etc., removes the communication apparatus 100 once installed on the ceiling, etc., and installs it at (moves it to) a different ceiling position, the administrator, etc., has to resume usage after setting again (storing) the position information 302 which indicates a new installed position after the moving. The reason is that, if the communication apparatus 100 is merely installed at (moved to) a different ceiling position, the communication apparatus 100 retains position information indicating a previously installed position before the moving set (stored), causing the communication apparatus 100 to output information on a position different from the installed position.

On the other hand, in order to improve ease of installation, ease of moving, reusability, etc., of the communication apparatus 100, it is also necessary to increase detachability of the communication apparatus 100.

Then, in the present variation, if the communication apparatus 100 which was once installed is removed from the ceiling, etc., after position information which indicates a position at which it was once installed on the ceiling, etc., is set (held) in the storage unit 300 of the communication apparatus 100, it is arranged for position information set in the storage unit 300 of the communication apparatus 100 to be deleted in order to improve accuracy of position information which the communication apparatus 100 has.

Therefore, while a user has to start usage after setting in (storing in) again the communication apparatus 100 position information indicating a new installed position after moving again when the communication apparatus 100 is moved and installed at (moved to) a different ceiling position again, the communication apparatus 100 outputting position information different from the installed position can be prevented to further improve accuracy of position information which the communication apparatus 100 has. Below, details are described.

(Exemplary Hardware Configuration of Communication Apparatus 100-2)

Figure 10:
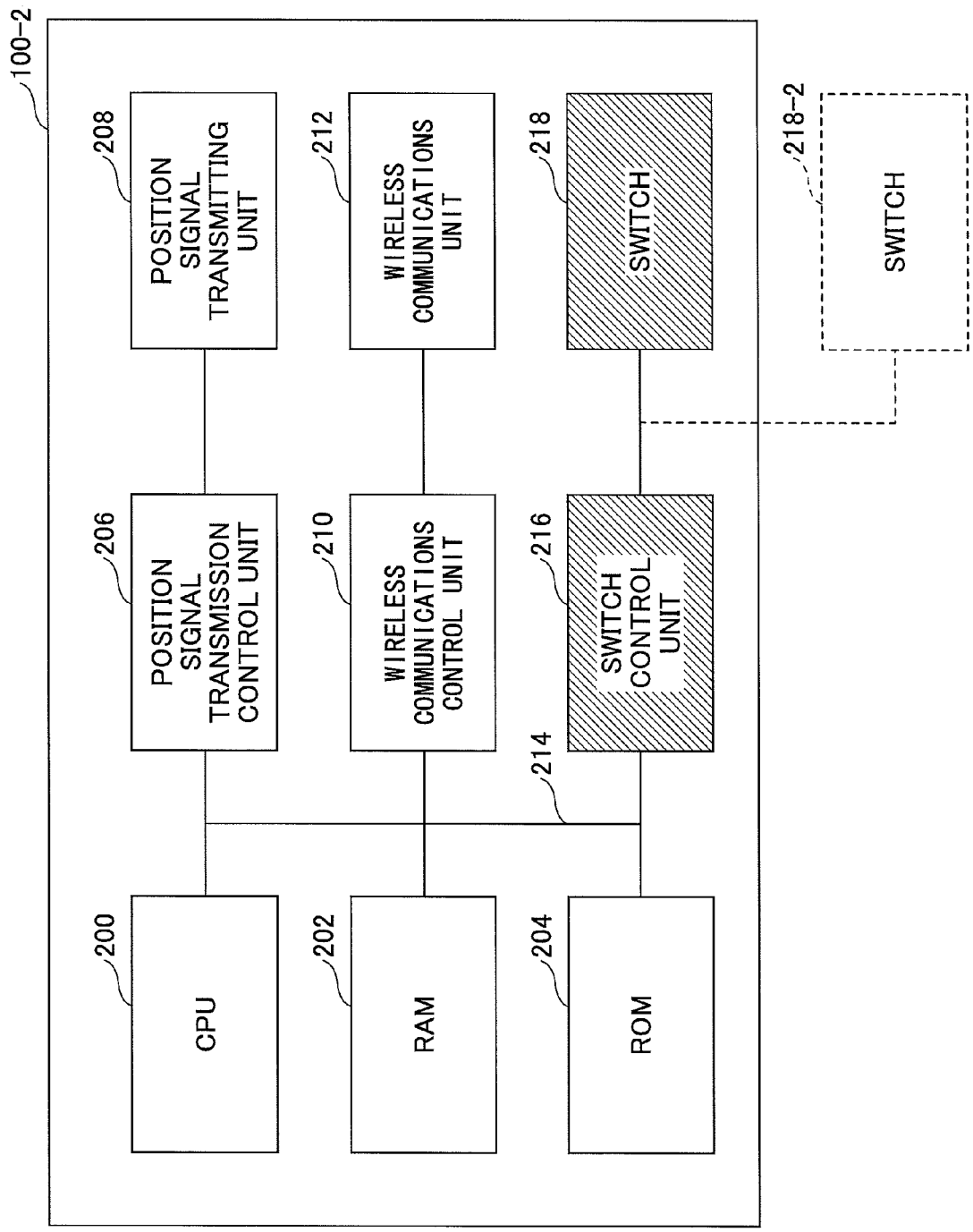
FIG. 10 is a diagram showing a hardware configuration of a communication apparatus 100-2 according to the present variation.

FIG. 10 shows a hardware configuration of a communication apparatus 100-2 according to the present variation. Relative to FIG. 2A, the communication apparatus 100-2 includes a switch control unit 216 and a switch 218 in addition to the CPU 200, the RAM 202, the ROM 204, the position signal transmission control unit 206, the position signal transmitting unit 208, the wireless communications control unit 210, the wireless communications unit 212, and the bus 214. Below, the different points are described.

The switch 218 is a switch for detecting whether the communication apparatus 100-2 is installed in a fixed manner on a fixed article such as the ceiling, etc., for example, or, in other words, for detecting an installed state of the communication apparatus 100-2. For example, as described below, the switch 218 is a projecting shaped switch installed in the communication apparatus 100-2. While this switch 218 is in a projecting state before it is installed, when the communication apparatus 100-2 is provided (installed) on the ceiling, etc., the projecting switch is pressed against a side face of the ceiling, etc., causing it to be in a pressed down state.

The switch control unit 216 detects the state of the switch 218 to detect whether the communication apparatus 100-2 is installed in a fixed manner on the fixed article such as the ceiling, for example, or, in other words, for detecting the installed state of the communication apparatus 100-2. As described above, when the switch 218 is in the pressed down state, for example, it is detected that the communication apparatus 100-2 is installed in a fixed manner on a fixed article such as the ceiling, for example. Moreover, when the switch 218 is in a non-pressed down state (a projecting state), it is detected that the communication apparatus 100-2 is not installed in a fixed manner on the fixed article such as the ceiling, for example.

The switch 218 can be configured to be embedded into the communication apparatus 100, or it can be configured to detect whether the communication apparatus 100-2 is installed in a fixed manner on a fixed object such as the ceiling, etc., for example, by using an external switch 218-2.

Specific Example 1

Figure 11:
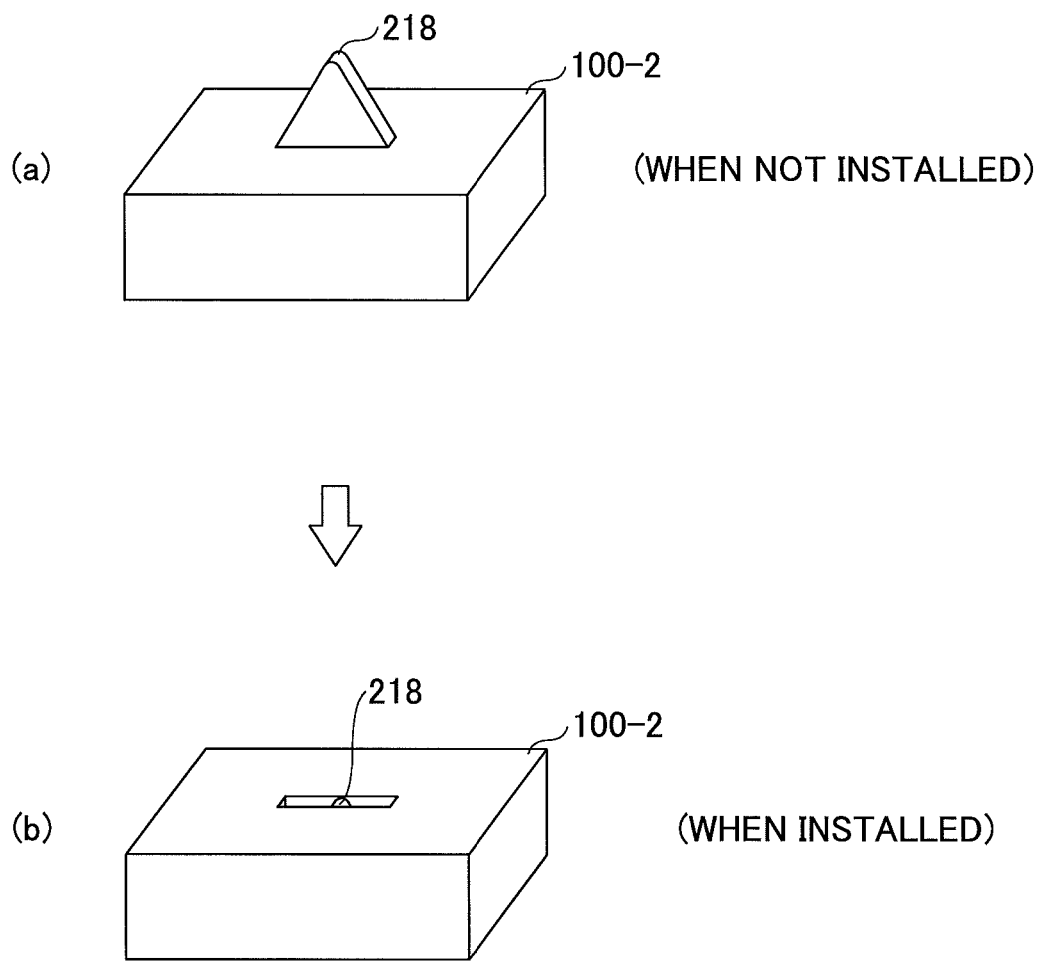
FIG. 11 is a diagram showing one example of the communication apparatus 100-2 according to the present variation.

FIG. 11 shows one example of the communication apparatus 100-2 according to the present variation. As shown, the communication apparatus 100-2 is provided with a switch 218 having a projecting shape. While this switch 218 is in a projecting state (a) before the communication apparatus 100-2 is installed, when the communication apparatus 100-2 is provided (installed) on the side face, the projecting switch is pressed against a side face of the ceiling, etc., causing it to be in a pressed down state (b).

The communication apparatus 100-2 can be embedded into the ventilating fan (the electrical equipment unit 2b), the access point for the wireless LAN (the electrical equipment unit 2c), the speaker (the electrical equipment unit 2d), the emergency light (the electrical equipment unit 2e), the fire detector or the smoke detector (the electrical equipment unit 2f), the surveillance camera (the electrical equipment unit 2g), and the air conditioner (the electrical equipment unit 2h).

In this case, these electrical equipment units are provided with the switch 218 which has the projecting shape. While this switch 218 is in a projecting state (a) before the electrical equipment units are provided (installed), when the electrical equipment unit is provided (installed), the projecting switch is pressed against a side face of the ceiling, a wall, etc., causing it to be in a pressed down state (b).

Specific Example 2

Figure 12:
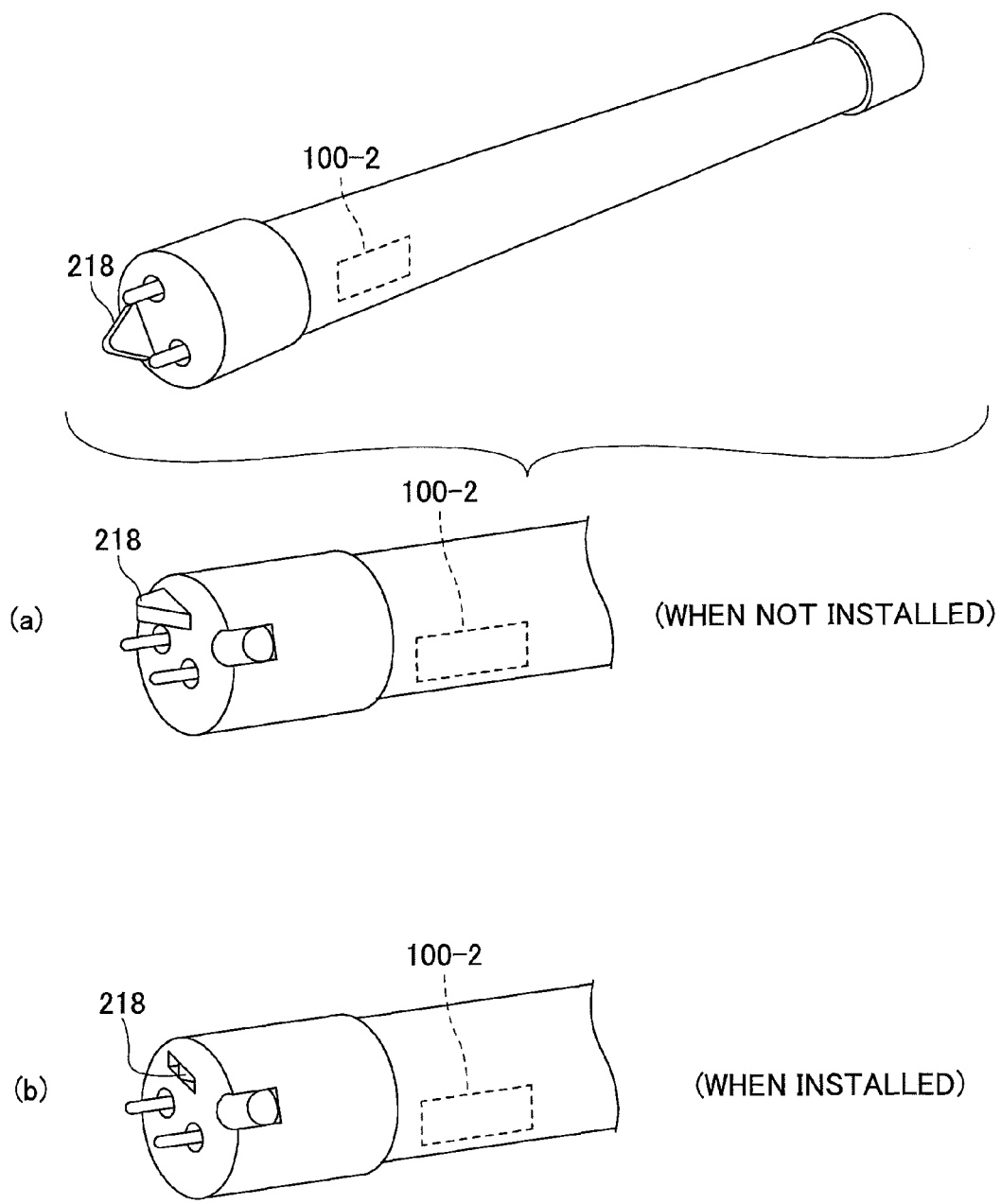
FIG. 12 is a diagram showing one example of the communication apparatus 100-2 according to the present variation.

FIG. 12 shows one example of the communication apparatus 100-2 according to the present variation. As shown, an embedded-type communication apparatus 100-2 is, for example, embedded in an LED fluorescent tube lighting fixture (the electrical equipment unit 2a), and the LED fluorescent tube is provided with the switch 218 having the projecting shape. While this switch 218 is in a projecting state (a) before the LED fluorescent tube is provided (installed), when the LED fluorescent tube is provided in an installation port (is installed), the projecting switch is pressed against a side face of the ceiling, etc., causing it to be in a pressed down state (b).

As in the exemplary figure, when the communication apparatus 100-2 is embedded into the LED fluorescent tube, a degree of convenience thereof is high in that installing the LED fluorescent tube in an office. etc., may result in installing the communication apparatus 100-2 at the same time, so that convenience thereof is high. Moreover, reusability is also high. On the other hand, detachability of the communication apparatus 100-2 is high, so that even a typical user can easily remove it and it can be reinstalled easily.

(Functions of Communication Apparatus 100-2)

Figure 13:
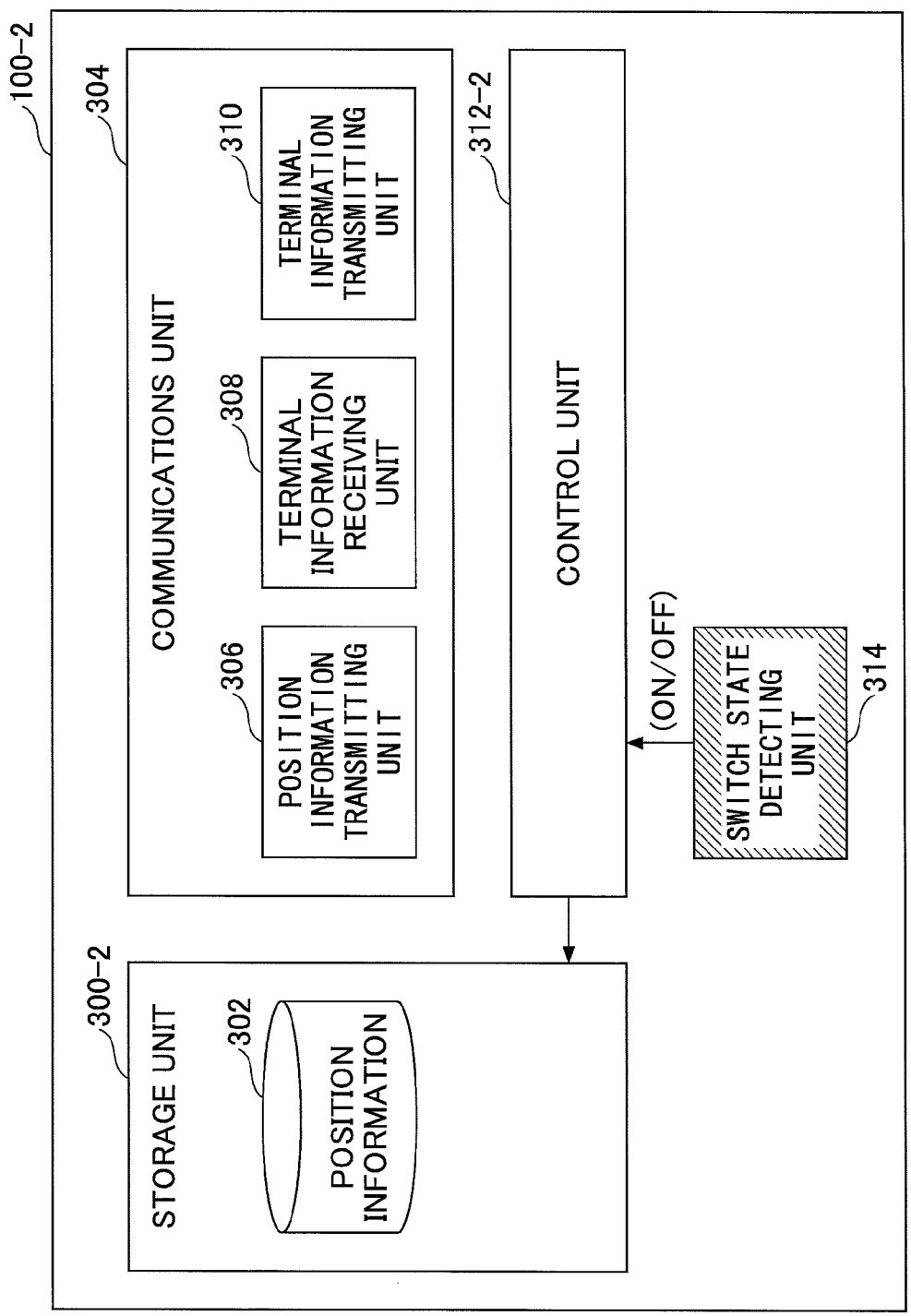
FIG. 13 is a functional block diagram of the communication apparatus 100-2 according to the present variation.

FIG. 13 shows a functional block diagram of a communication apparatus 100-2 according to the present variation. Relative to FIG. 3A, it includes a switch state detecting unit 314 in addition to the communications unit 304. Moreover, it includes a control unit 312-2 and a storage unit 300-2 having some functions different from the control unit 312 and the storage unit 300.

The switch state detecting unit 314, which is specifically realized by the above-described switch 218 and the switch control unit 216, detects whether the communication apparatus 100-2 is installed in a fixed manner on a fixed article such as the ceiling, for example, or, in other words, an installed state of the communication apparatus 100-2. In other words, the switch state detecting unit 314 detects an installed state (for example, ON) when the communication apparatus 100-2 is provided (installed) on the ceiling, etc., while it detects a non-installed state (for example, OFF) when the communication apparatus 100-2 is removed from the ceiling, etc. The switch state detecting unit 314 reports the detected installed state to the control unit 312-2.

When a non-installed state (for example, OFF) is detected after an installed state (for example, OFF) is once detected by the switch state detecting unit 314, the control unit 312-2 instructs the storage unit 300-2 to erase the position information 302 being stored.

The storage unit 300-2 stores the position information 302 of the communication apparatus 100-2. Moreover, when a non-installed state (for example, OFF) is detected after an installed state (for example, ON) is once detected by the switch state detecting unit 314, the storage unit 300-2 erases the position information 302 which was stored in accordance with a position information erasing instruction from the control unit 312-2. In other words, when the communication apparatus 100-2 is provided (installed) on the ceiling, etc., after which the communication apparatus 100-2 is removed from the ceiling, etc., the storage unit 300-2 conducts an operation of erasing the position information 302 which was stored, for example.

After the erasing, the position information transmitting unit 306 may not obtain the position information 302 from the storage unit 300-2 and may not wirelessly transmit the position information 302 to the wireless terminal 120.

(Operation of Communication Apparatus 100-2)

Figure 14:
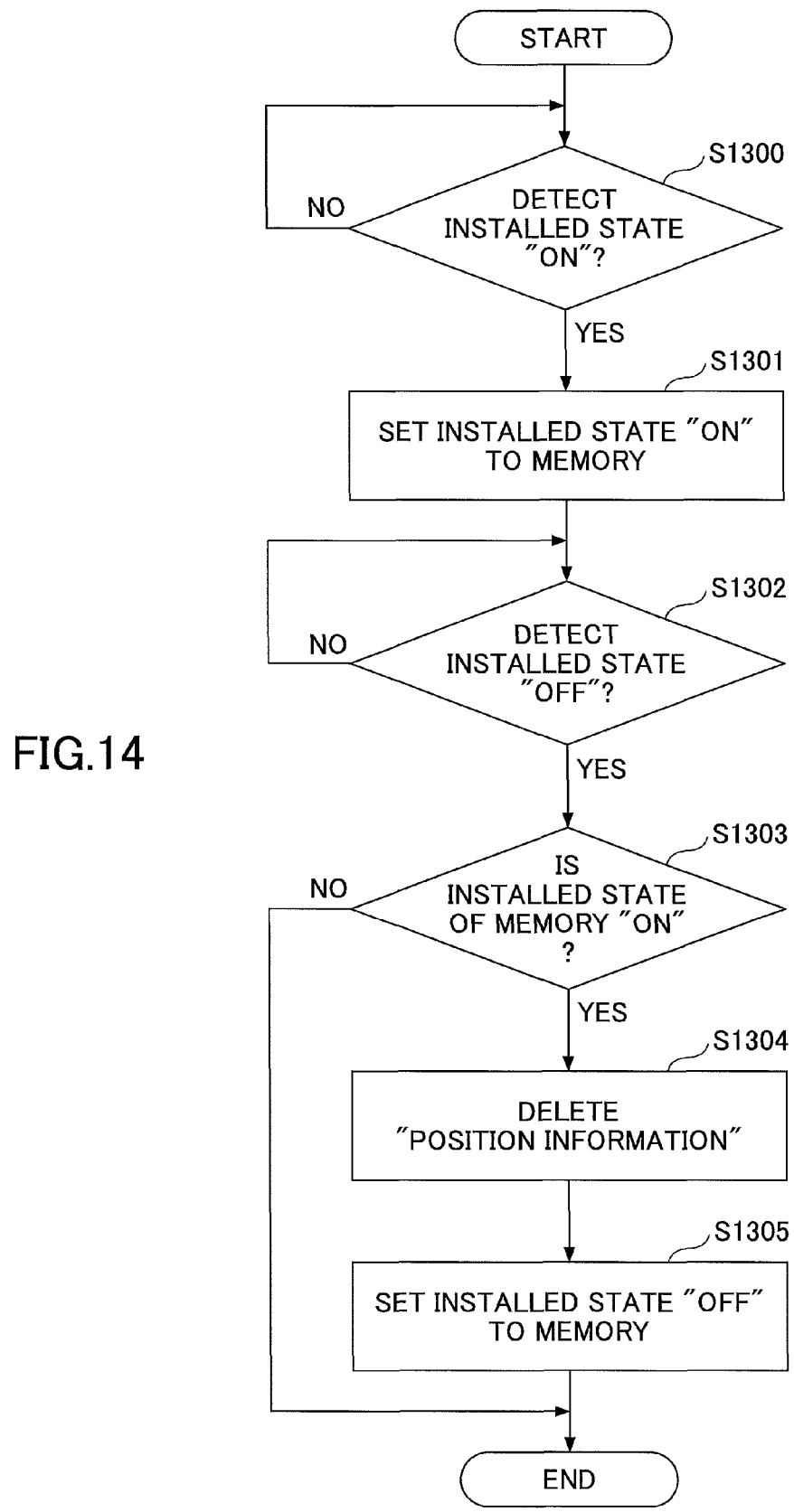
FIG. 14 is a flowchart showing an operation of the communication apparatus 100-2 according to the present variation.

FIG. 14 is a flowchart showing an operation of the communication apparatus 100-2 according to the present variation. An operation entity of the flowchart is the control unit 312-2 of the wireless terminal 100-2.

In step S1300, the control unit 312-2 determines whether the installed state "ON" is detected.

For example, if the communication apparatus 100-2 is provided (installed) on the ceiling, etc., a projecting switch is pressed against a side face of the ceiling, etc., causing it to be in a pressed down state. Then, the installed state (for example, ON) is detected by the switch state detecting unit 314, which detecting is reported from the switch state detecting unit 314 to the control unit 312-2. When the installed state "ON" is detected, the control unit 312-2 proceeds to the next step.

In step S1301, the control unit 312-2 sets the installed state "ON" (for example, set a flag 1 which indicates the installed "ON") in a non-volatile memory such as the ROM 204, for example.

Here, the position information 302 is stored in the storage unit 300-2 of the communication apparatus 100-2 (FIG. 4, for example). Then, this position information 302 is to be eventually used for specifying a position at which the wireless terminal 120 resides on the management server 160 via wireless transmission, etc., to the wireless terminal 120 within a predetermined range (for example, S800 in FIG. 8).

In step S1302, the control unit 312-2 determines whether the installed state "OFF" is detected.

For example, when the communication apparatus 100-2 is removed from the ceiling, etc., the non-installed state (for example, OFF) is detected. When the installed state "OFF" is detected, the control unit 312-2 proceeds to the next step.

In step S1303, the control unit 312-2 refers to the above-described memory and determines whether the installed state "ON" is set (for example, determines whether a flag 1 which indicates the installed state "ON" is set). Here, if the installed state "ON" is set, the control unit 312-2 may determine that the communication apparatus 100-2 was provided on the ceiling, etc., once and then was removed from the ceiling, etc.

In step S1304, the control unit 312-2 instructs the storage unit 300-2 to erase the position information 302 presently stored. In this way, in accordance with the position information erasing instruction from the control unit 312-2, the storage unit 300-2 erases the position information 302 which was stored. In other words, when the communication apparatus 100-2 is provided (installed) on the ceiling, etc., after which the communication apparatus 100-2 is removed from the ceiling, etc., the storage unit 300-2 conducts an operation of erasing the position information 302 which has been stored.

Here, an example of a table for storing therein the position information 302 is shown in FIG. 15. Compared to FIG. 4, it is seen that the position information 302 is deleted. After the erasing, the position information transmitting unit 306 may not obtain the position information 302 from the storage unit 300-2 and may not wirelessly transmit the position information 302 to the wireless terminal 120 (not serving a role as the communication apparatus 100-2).

In step S1305, the control unit 312-2 sets the installed state "OFF" (for example, set a flag 0 which indicates the installed state "OFF") in the above-described memory.

As described above, when the communication apparatus 100-2 is provided (installed) on the ceiling, etc., once, after which the communication apparatus 100-2 is removed from the ceiling, etc., the communication apparatus 100-2 conducts an operation of erasing the position information 302 which has been stored. In this way, while, when the communication apparatus 100-2 is installed at (moved to) a different position after being installed once, the user has to start usage after setting in (storing in) the communication apparatus 100-2 again position information which indicates a new installed position after moving so that, it is made possible to prevent the communication apparatus 100-2 from outputting information on a position which is different from an installed position.

Here, while it is easy even for a typical user to remove and re-install when detachability of the communication apparatus 100-2 installed is high in particular, according to the communication apparatus 100-2 of the present variation, the position information 302 of the communication apparatus 100-2 is erased, making it possible to prevent the communication apparatus 100-2 from outputting information on a position which is different from an installed position (for example, information on a position of a previous installation) even when the communication apparatus 100-2 is installed or reused at a different location.

Now, a case is referred to in which an embedded-type communication apparatus 100-2 is embedded in an LED fluorescent tube lighting fixture (FIG. 12), for example, where the communication apparatus 100-2 itself does not have a power supply providing capability.

In this case, a removal of the LED fluorescent tube from the lighting fixture means cutting off a power supply provision into the communication apparatus 100-2. Then, in the communication apparatus 100-2, the control unit 312-2 of the communication apparatus 100-2 instructs erasing of the stored position information 302 by the storage unit 300-2 instantaneously at a timing at which the switch 218 being just about to turned off was detected using a state of the switch 218 (FIG. 12).

On the other hand, there is also a method in which a volatile memory such as the RAM 202 (FIG. 2A), etc., is adopted for the storage unit 300-2. In this case, when the LED fluorescent tube is removed from the fluorescent lighting fixture, power supply from the fluorescent lighting fixture is cut off, so that the position information 302 stored in the RAM 202 is erased.

(Supplement 1)

Here, in the present variation, it may be arranged (for a detecting unit) to detect a non-installed state (OFF, for example) of the communication apparatus 100-2 also on the management server 160 side when the communication apparatus 100-2 is removed from the ceiling, etc. In this way, the display unit 372 of the management server 160 may perform displaying which reports removal of the communication apparatus 100-2 for the administrator to speedily recognize the removal of the communication apparatus 100-2 from the ceiling, etc.

In this case, first, in step S1301 in FIG. 14, if the installed state "ON" is set, the control unit 312-2 of the communication apparatus 100-2 also transmits, to the management server 160 via the communication unit 304, an ON flag indicating the installed state "ON" and identification information (for example, a MAC address, a specific product ID, etc., included since the time of factory shipment) of the communication apparatus 100-2.

The management server 160 receives identification information of the communication apparatus 100-2 and an ON flag indicating the installed state "ON" from the communication apparatus 100-2 to recognize that the communication apparatus 100-2 is in the installed state "ON".

After recognizing the installed state "ON", the management server 160 transmits packets periodically for performing checking presence to the communication apparatus 100-2 for which the installed state "ON" is recognized. (The communication apparatus 100-2 may independently transmit packets for checking the presence to the management server 160).

Then, the management server 160 determines that the communication apparatus 100-2 for which there was a response is in the installed state "ON". On the other hand, the management server 160 detects that the communication apparatus 100-2 for which there was no response moved to the installed state "OFF" and reports the detecting to the administrator, etc., via the display unit 372.

(Supplement 2)

FIG. 16 is a diagram for describing a position information setting operation of the management server 160 according to the present variation. For example, the management server 160 can set position information in the communication apparatus 100-2 as follows:

In S1601, the wireless terminal 120 which can transmit and receive IMES and ZigBee receives identification information (an MAC address, a specific product ID included since the time of factory shipment) and position information of the communication apparatus 100-2 from the communication apparatus 100-2 has at a timing at which the communication apparatus 100-2 set the installed state "ON", for example (step S1301 in FIG. 14). In the communication apparatus 100-2, correct position information is not yet set (not yet stored) at this time, but, when an installer of the communication apparatus 100-2 sets position information indicating an approximate position manually, etc., from a management standpoint, relevant dummy position information is received.

In S1602, the wireless terminal 120 transmits a position information setting request of the communication apparatus 100-2 to the gateway 140. The position information setting request is to include the identification information and the position information of the communication apparatus 100-2.

In S1603, the gateway 140 transmits the position information setting request to the management server 160.

In S1604, upon receiving the position information setting request, the management server 160 transmits correct position information to be set for the communication apparatus 100-2. Moreover, the management server 160 recognizes that the communication apparatus 100-2 is in the installed state "ON".

In S1605, the gateway 140 receives position information for the communication apparatus 100-2 from the management server 160 and transmits the position information to the communication apparatus 100-2 to be a destination. Upon receiving the position information from the management server 160 via the gateway 140, the communication apparatus 100-2 stores it in the storage unit 300-2.

The above-described method makes it possible to easily set the position information again for the communication apparatus 100-2 for which position information is once erased after being removed. As a matter of course, a person who can set the position information is only a person with an operation privilege of the management server 160.

The position information may be set as follows in the communication apparatus 100-2 by the below-described S1606 in lieu of the above-described operations in S1601-S1605.

In S1606, using ZigBee, the wireless terminal 120 transmits, to the communication apparatus 100-2 using ZigBee, a request for setting position information including position information of the communication apparatus 100-2. The communication apparatus 100-2 receives the request for setting the position information via the wireless communication apparatus 212 and obtains position information from the request for setting position information by the wireless communications control unit 210. The communication apparatus 100-2 stores the obtained position information in the storage unit 300-2.

When adopted to only IEEE 802.15.4 standards, the wireless communication apparatus 212 of the communication apparatus 100-2 uses a separate wireless communication apparatus adopted to ZigBee to receive the request for setting position information and performs IMES conversion from ZigBee of the request for setting position information that is received by the CPU 200. Then, the communication apparatus 100-2 receives the converted request for setting the position information and obtains position information from the request for setting position information by the wireless communication apparatus 212. The communication apparatus 100-2 stores the obtained position information in the storage unit 300-2.

In the above, the present embodiment makes it possible to provide a position information management system, etc., which efficiently manage position information. The present invention is not limited to a specific embodiment, so that variations and changes are possible within a scope of a gist of the present invention that is recited in the claims.

The present application is based on and claims the benefit of priority of Japanese Priority Application No. 2012-123116 filed on May 30, 2012 and Japanese Priority Application No. 2013-043648 filed on Mar. 6, 2013, the entire contents of which are hereby incorporated by reference.

The invention claimed is:

1. A communication apparatus to transmit information on a position at which the communication apparatus is positioned, comprising:
    a detecting unit to detect one of a first signal detected when the communication apparatus is fixed to an installed location, and a second signal detected when the communication apparatus is brought to a state in which the communication apparatus is not fixed to the installed location;
    a storage unit to store therein the position information; and
    a control unit to erase the position information stored in the storage unit when the second signal is detected after the first signal is detected by the detecting unit,
    wherein the communication apparatus includes a projection, containable in a body of the communication apparatus, and wherein the detecting unit is configured to detect the first signal when the projection is contained in the body of the communication apparatus.

2. The communication apparatus as claimed in claim 1, wherein the communication apparatus is installed on a wall face; and wherein the detecting unit is configured to detect the first signal by the projection being pressed down by the wall face and housed in the body of the communication apparatus when the communication apparatus is installed on the wall face.

3. The communication apparatus as claimed in claim 1, wherein the communication apparatus is embedded into a fluorescent tube; wherein the fluorescent tube has a projection containable in the body of the fluorescent tube; and wherein the detecting unit is configured to detect the first signal when the projection is contained in the body of the fluorescent tube.

4. The communication apparatus as claimed in claim 3, wherein the fluorescent tube is installed in a fluorescent tube installing apparatus; and wherein the detecting unit is configured to detect the first signal by the projection being pressed down by the fluorescent tube installing apparatus and housed in the body of the fluorescent tube when the fluorescent tube is installed in the fluorescent tube installing apparatus.

5. A position information management system including a management server and a communication apparatus to transmit information on a position at which the communication apparatus is positioned, wherein the communication apparatus includes
    a detecting unit to detect one of a first signal detected when the communication apparatus is fixed to an installed location and a second signal detected when the communication apparatus is brought to a state in which the communication apparatus is not fixed to the installed location;
    a storage unit to store therein the position information; and
    a control unit to erase the position information stored in the storage unit when the second signal is detected after the first signal is detected by the detecting unit; and wherein the management server includes
    a detecting unit to detect that an installed state of the communication apparatus has moved to a non-fixed state when the communication apparatus is brought to the non-fixed state after the installed state of the communication apparatus is in a fixed state,
    the communication apparatus including a projection containable in a body of the communication apparatus, wherein the detecting unit is configured to detect the first signal when the projection is contained in the body of the communication apparatus.

6. A method of managing position information of a communication apparatus configured to transmit information on a position at which the communication apparatus is positioned, the communication apparatus including a projection containable in a body of the communication apparatus, the method comprising:
  detecting one of a first signal detected when the communication apparatus is fixed to an installed location, and a second signal detected when the communication apparatus is brought to a state in which it is not fixed to the installed location, the detecting including detecting the first signal when the projection is contained in the body of the communication apparatus; and
  erasing position information stored in a storage unit when the second signal is detected after the first signal is detected during the detecting.

7. A communication apparatus to transmit information on a position at which the communication apparatus is positioned, comprising:
  a detecting unit to detect one of a first signal detected when the communication apparatus is fixed to an installed location, and a second signal detected when the communication apparatus is brought to a state in which the communication apparatus is not fixed to the installed location;
  a storage unit to store therein the position information; and
  a control unit to erase the position information stored in the storage unit when the second signal is detected after the first signal is detected by the detecting unit,
  the communication apparatus being embedded into a fluorescent tube and a projection being containable in a body of the fluorescent tube, wherein the detecting unit is configured to detect the first signal when the projection is contained in the body of the fluorescent tube.

8. The communication apparatus as claimed in claim 7, wherein the fluorescent tube is installed in a fluorescent tube installing apparatus; and wherein the detecting unit is configured to detect the first signal by the projection being pressed down by the fluorescent tube installing apparatus and housed in the body of the fluorescent tube when the fluorescent tube is installed in the fluorescent tube installing apparatus.

* * * * *